(12) United States Patent
Ryan et al.

(10) Patent No.: US 9,797,367 B2
(45) Date of Patent: Oct. 24, 2017

(54) WAVE ENERGY CONVERSION

(71) Applicant: Bombora Wave Power Pty Ltd, South Perth (AU)

(72) Inventors: Glen Lee Ryan, South Perth (AU); Shawn Kay Ryan, Como (AU)

(73) Assignee: Bombora Wave Power Pty Ltd, South Perth (AU)

( * ) Notice: Subject to any disclaimer, the term of this patent is extended or adjusted under 35 U.S.C. 154(b) by 277 days.

(21) Appl. No.: 14/622,717

(22) Filed: Feb. 13, 2015

(65) Prior Publication Data

US 2015/0226176 A1 Aug. 13, 2015

Related U.S. Application Data

(63) Continuation of application No. PCT/AU2013/000869, filed on Aug. 7, 2013.

(51) Int. Cl.
| | |
|---|---|
| *F03B 13/22* | (2006.01) |
| *F03B 13/18* | (2006.01) |
| *F03B 13/16* | (2006.01) |
| *F03B 13/12* | (2006.01) |
| *F03D 9/00* | (2016.01) |
| *F03B 13/24* | (2006.01) |

(52) U.S. Cl.
CPC .............. *F03B 13/22* (2013.01); *F03B 13/12* (2013.01); *F03B 13/16* (2013.01); *F03B 13/188* (2013.01); *F03B 13/24* (2013.01); *F03D 9/008* (2013.01); *F03B 13/189* (2013.01); *F03B 13/1885* (2013.01); *F03B 13/1895* (2013.01); *F05B 2240/40* (2013.01); *F05B 2240/93* (2013.01); *F05B 2240/97* (2013.01); *Y02E 10/38* (2013.01); *Y02E 10/72* (2013.01)

(58) Field of Classification Search
CPC .......... F03B 13/22; F03B 13/16; F03B 13/12; F03B 13/188; F03B 13/24; F03B 13/1895; F03B 13/1885; F03B 13/189; F03D 9/008; Y02E 10/72; Y02E 10/38; F05B 2240/93; F05B 2240/40; F05B 2240/97
USPC ................................ 60/495–507; 290/42, 53
See application file for complete search history.

(56) References Cited

U.S. PATENT DOCUMENTS

| | | | | |
|---|---|---|---|---|
| 3,353,787 A | * | 11/1967 | Semo .................... | F03B 13/148 417/330 |
| 5,329,497 A | * | 7/1994 | Previsic ................. | F03B 13/18 290/42 |

(Continued)

FOREIGN PATENT DOCUMENTS

WO WO 2012/095669 7/2012

*Primary Examiner* — Hoang Nguyen
(74) *Attorney, Agent, or Firm* — Levine Bagade Han LLP

(57) ABSTRACT

A wave energy converter (WEC) 10 has a body portion 18 with a face 20 and at least one flexible membrane 16 bounding at least part of a volume of a fluid to form a variable volume cell 22. The membrane is inclined from vertical providing a flow smoothed passage for wave energy from a wave 14 to travel over the WEC whilst deforming the at least one membrane towards the body to compress the fluid. The cell(s) can be submerged or floating. The inclination of the at least one membrane assists conversion of potential and kinetic energy of the wave to pressure within the fluid. Fluid pressure within the WEC cell(s) and/or system can be optimised to suit wave and/or performance conditions.

41 Claims, 21 Drawing Sheets

(56) References Cited

U.S. PATENT DOCUMENTS

| | | | | |
|---|---|---|---|---|
| 5,349,819 | A * | 9/1994 | Margittai | F03B 13/148 |
| | | | | 417/330 |
| 8,604,631 | B2 * | 12/2013 | Rohrer | F03B 13/1815 |
| | | | | 290/42 |
| 2006/0090463 | A1 * | 5/2006 | Burns | F03B 13/148 |
| | | | | 60/495 |
| 2006/0202483 | A1 * | 9/2006 | Gonzalez | F03B 13/1845 |
| | | | | 290/53 |
| 2009/0001729 | A1 | 1/2009 | Winsloe | |
| 2010/0013229 | A1 * | 1/2010 | Da Costa | F03B 13/20 |
| | | | | 290/53 |
| 2011/0162357 | A1 | 7/2011 | Bellamy et al. | |
| 2011/0185721 | A1 | 8/2011 | Turner | |
| 2012/0032446 | A1 | 2/2012 | Rohrer | |

\* cited by examiner

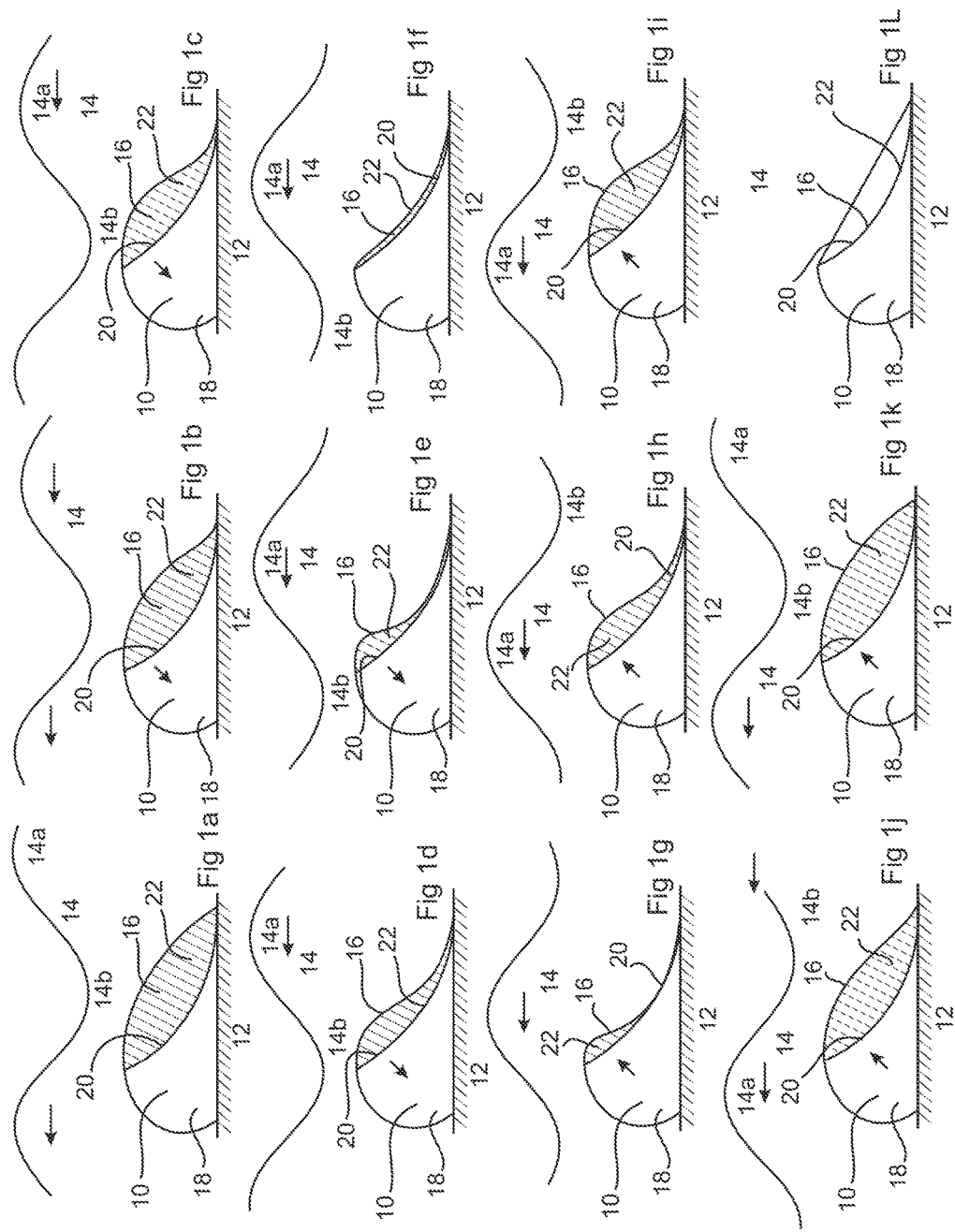

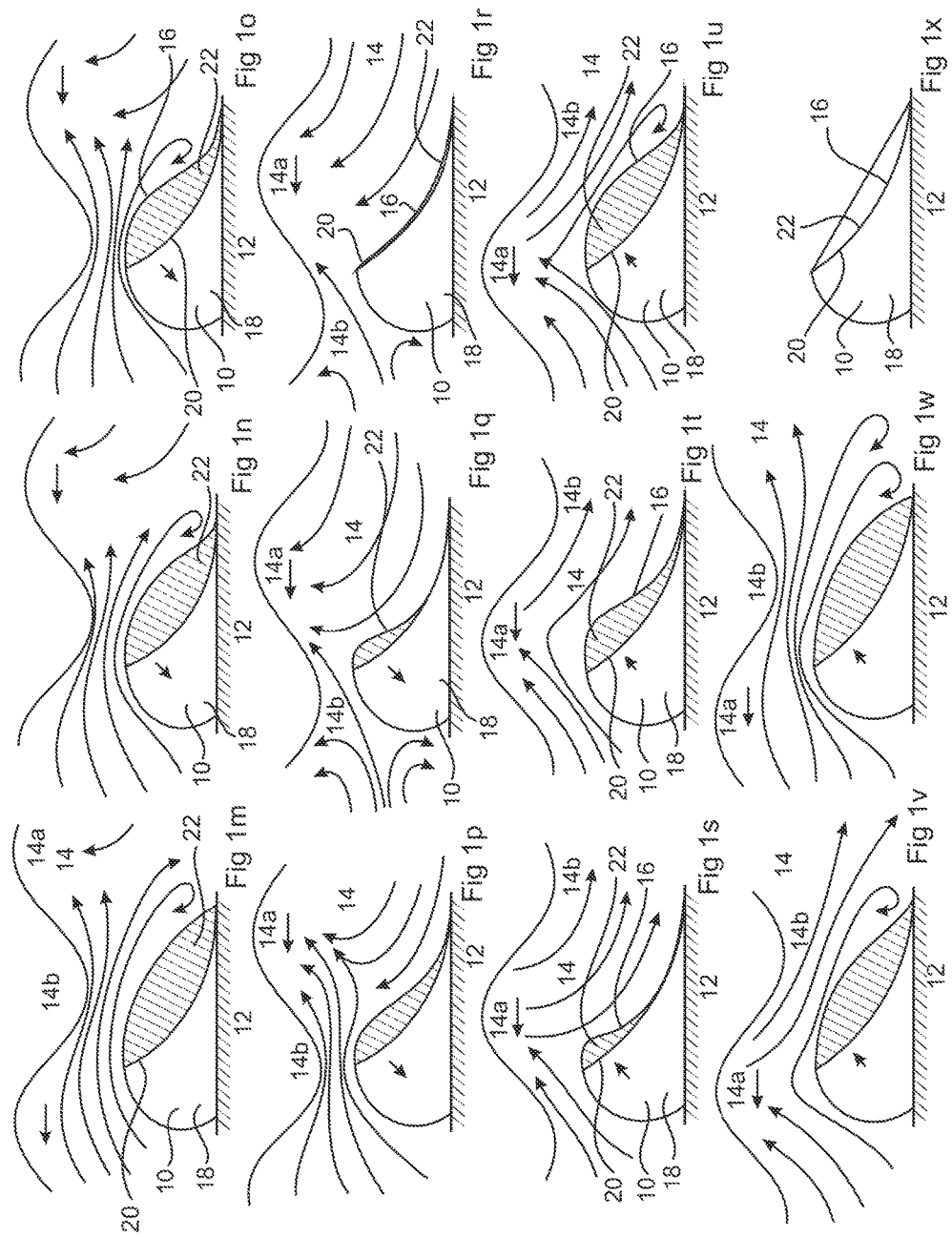

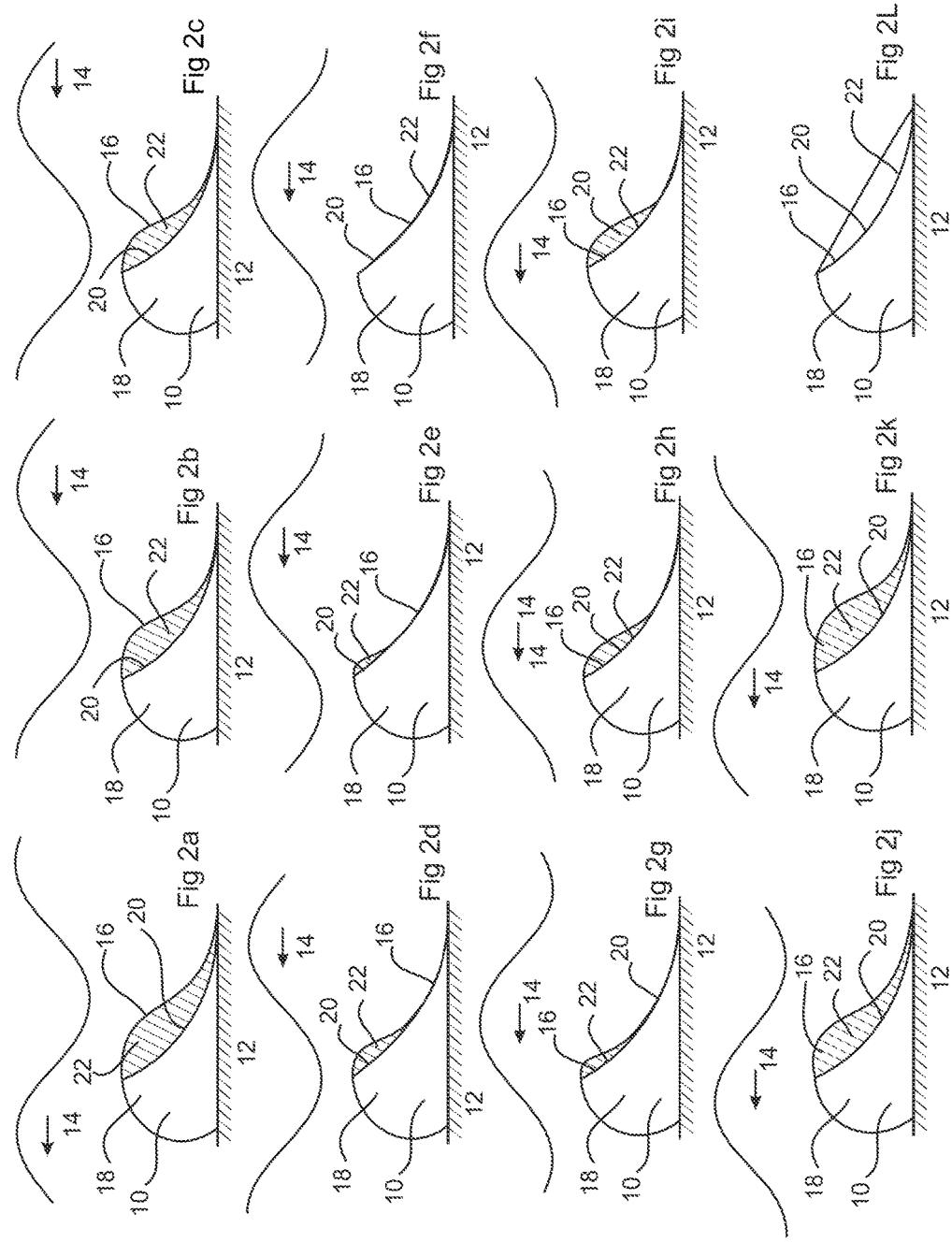

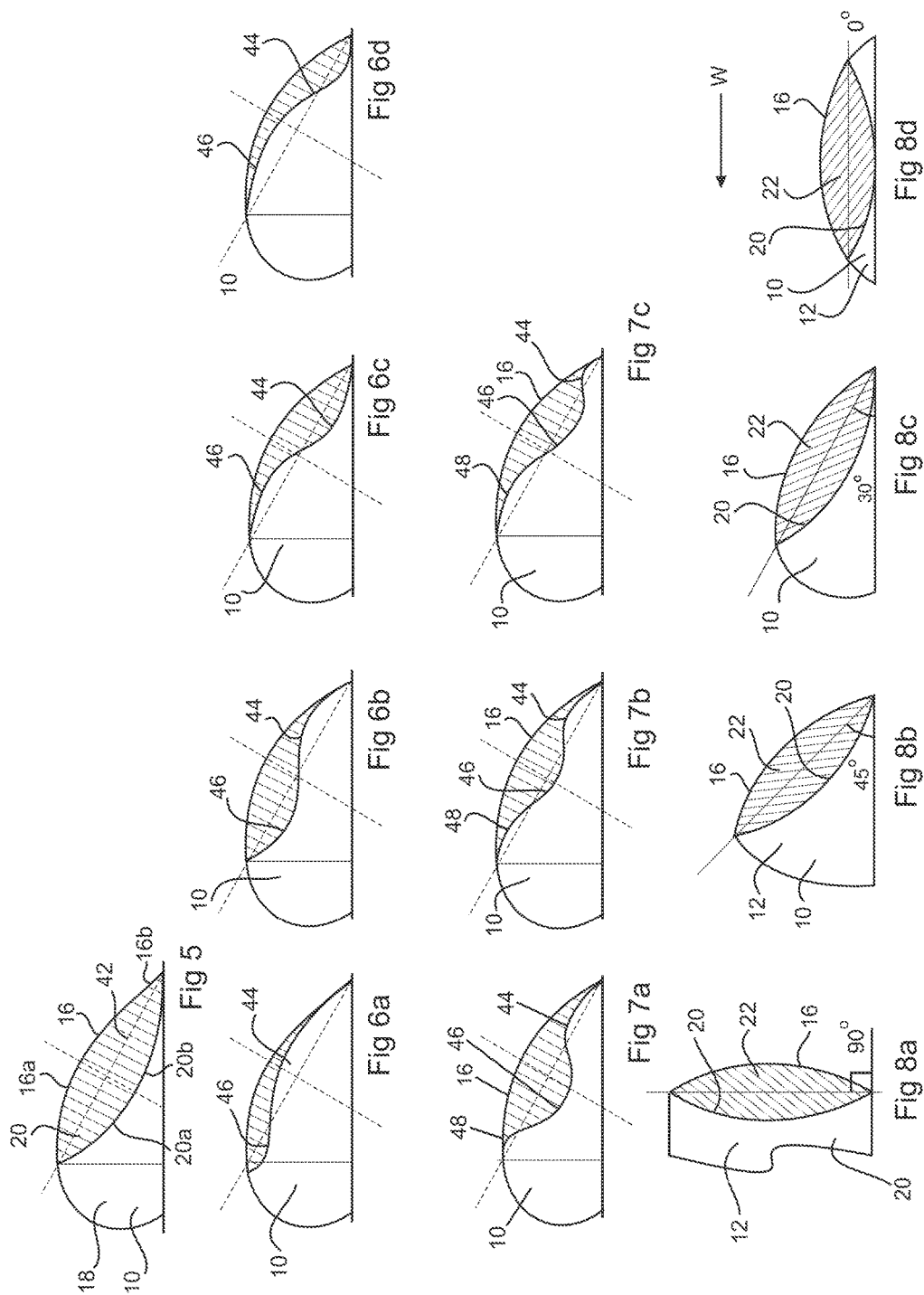

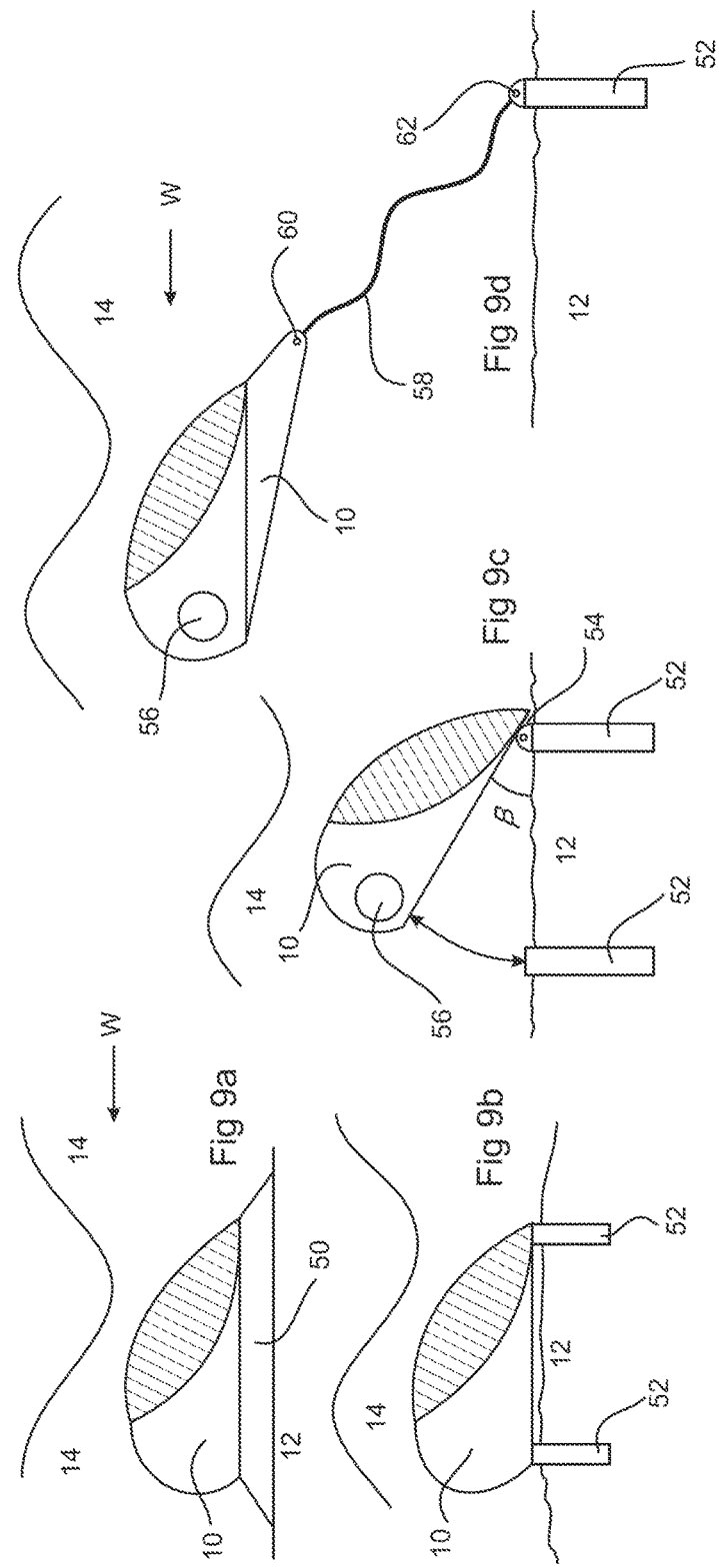

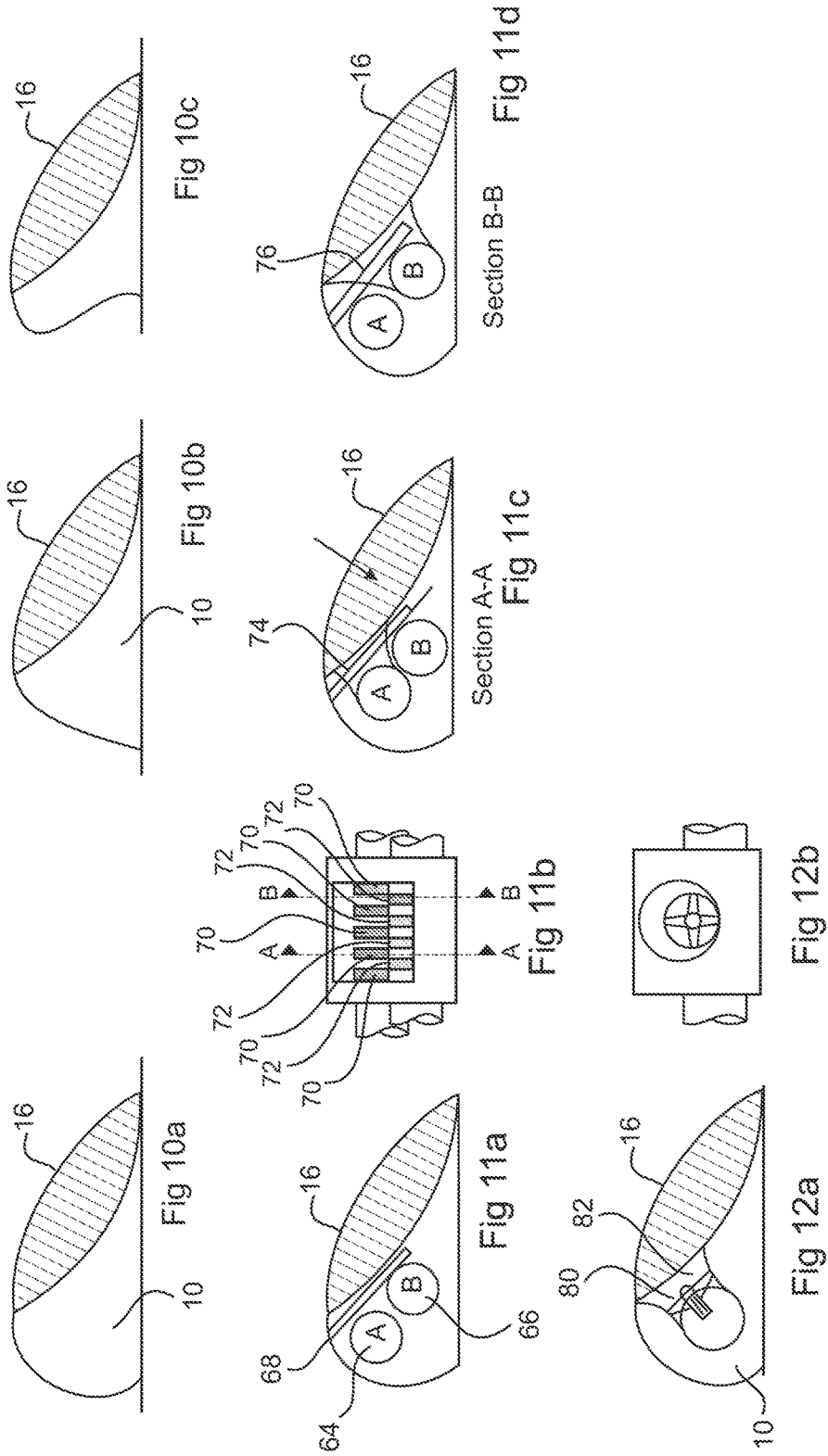

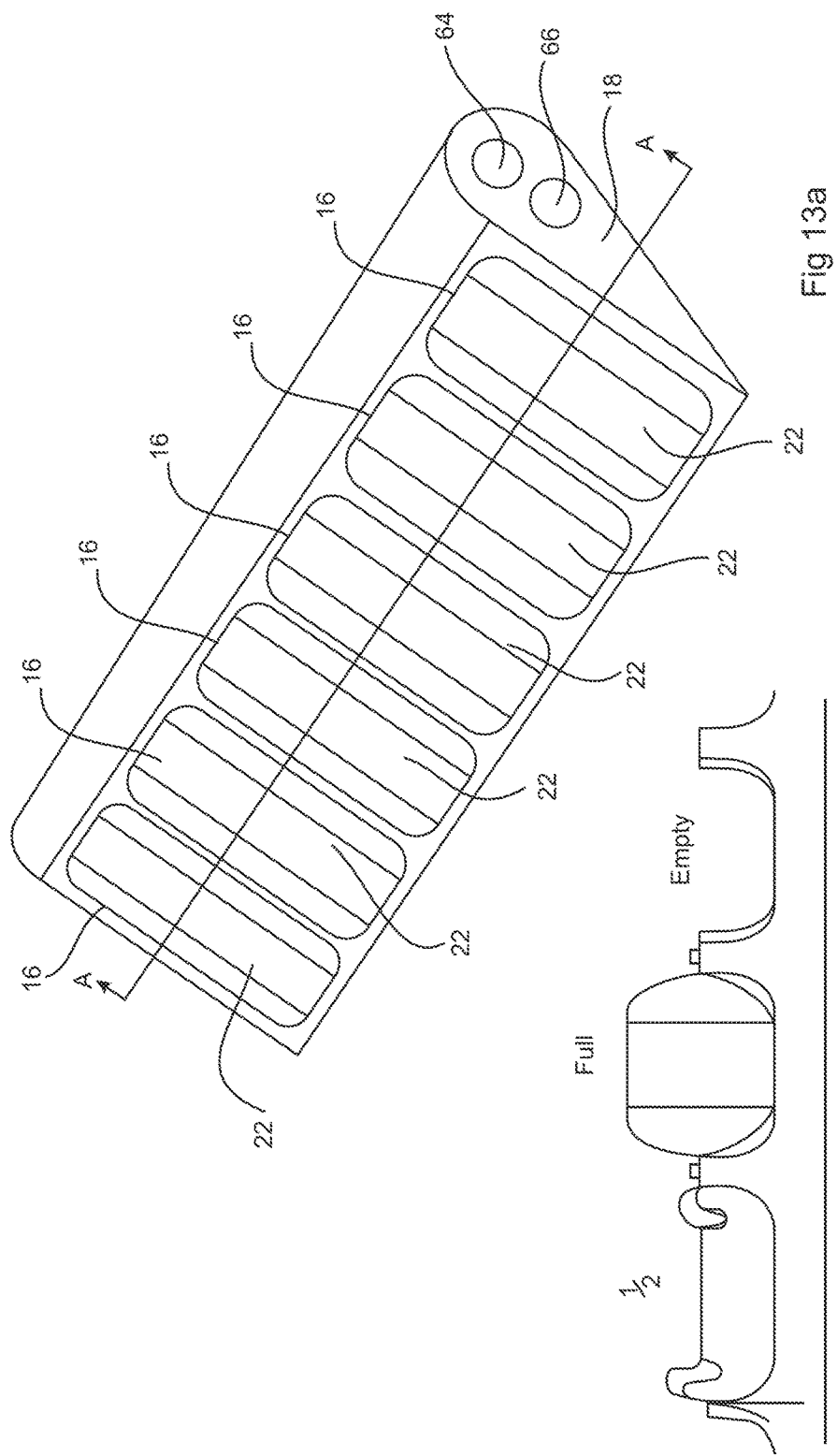

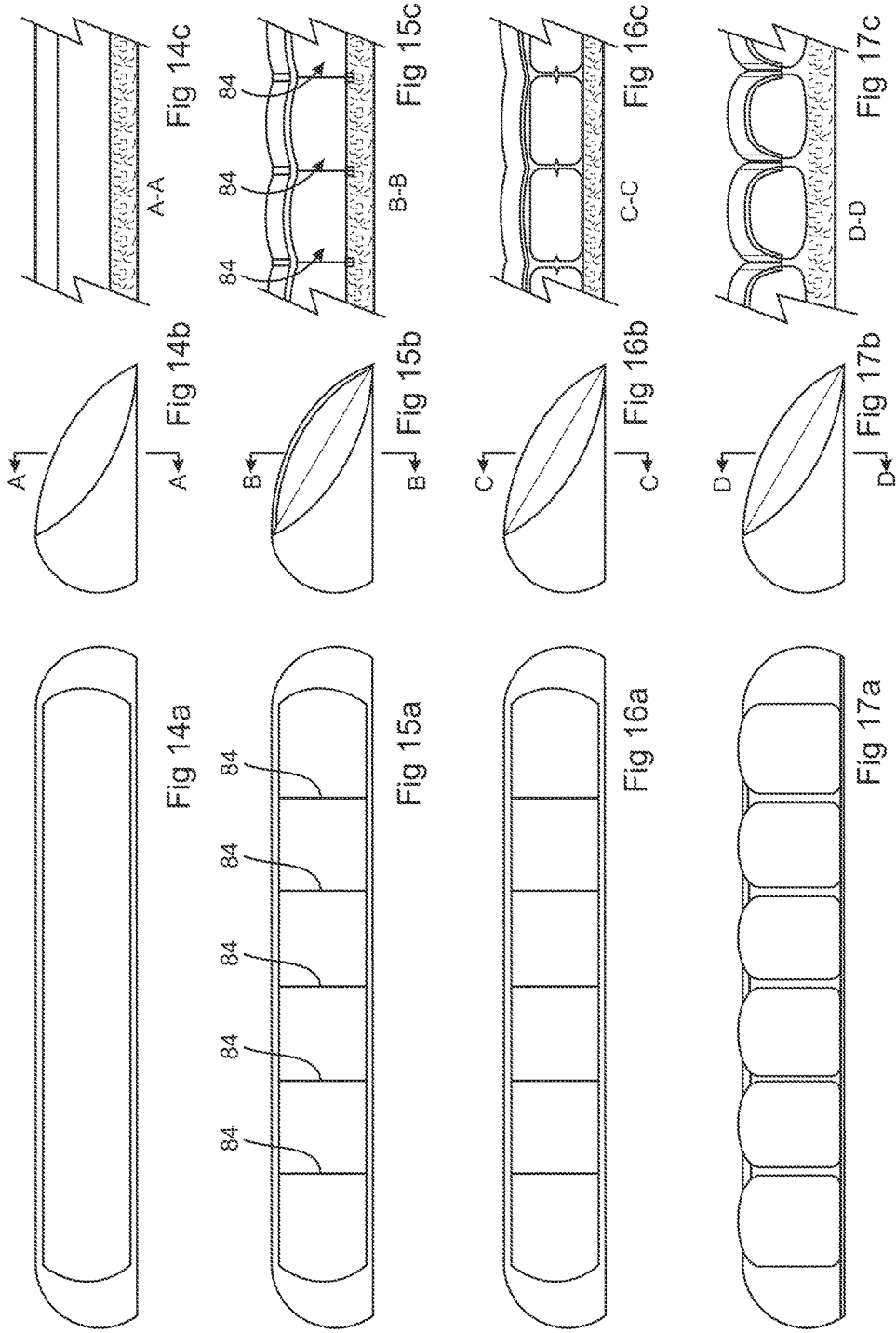

section A-A section B-B

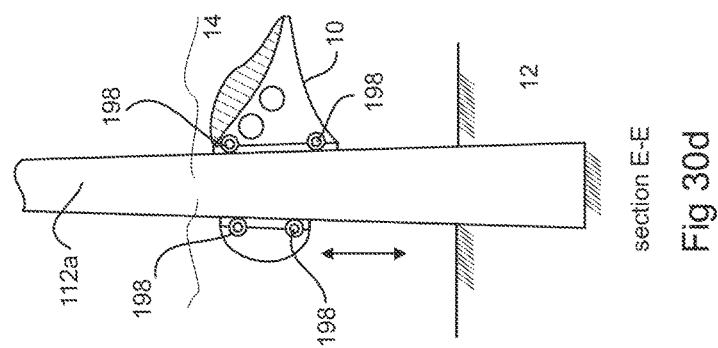
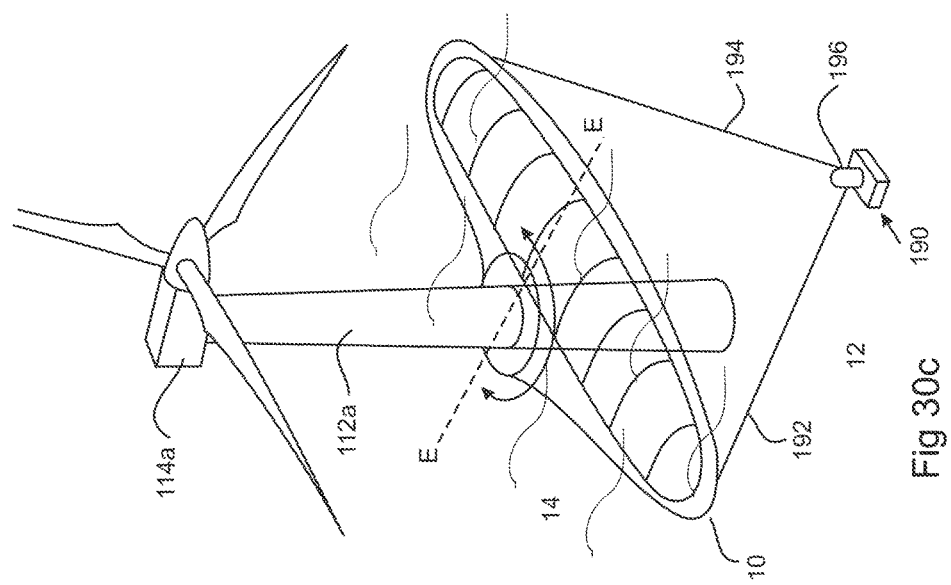

WAVE ENERGY CONVERSION

CROSS-REFERENCE TO RELATED APPLICATION

This application is a continuation of International Application No. PCT/AU2013/000869, filed 7 Aug. 2013, which claims priority to Australian Application No. 2012903556, filed 17 Aug. 2012 both of which are incorporated by reference herein in their entireties.

FIELD OF THE INVENTION

The present invention relates to wave energy conversion.

BACKGROUND TO THE INVENTION

With present concerns over global warming, carbon emissions and limited access to or availability of traditional fossil fuels, sources of alternative, renewable, energy are becoming more and more important.

Solar, wind and wave power systems for generating electrical energy are well known. Solar thermal energy systems work well when there is sufficient sunlight, otherwise energy needs to be stored during sunlight hours and released overnight if continuous energy output is required. This is often achieved through phase change salts which liquefy when storing thermal energy and re-solidify when that thermal energy is released. However, if insufficient thermal energy cannot be stored during daylight hours, there is a risk of energy output being exhausted.

Wind energy obviously requires sufficient movement of air to generate power form wind turbines. Whilst wind turbine technology has progressed and wind energy has become more cost effective, there remains the challenge of intermittency and of siting multiple wind turbines sufficient to generate the required amount of renewable energy. Wind turbines create a visual and noise impact on land that is not always acceptable to locals. Wind farms have more recently been sited out at sea in order to benefit from more reliable prevailing winds and to reduce the environmental impact from the presence of the tall wind turbines.

The extraction of energy from the seas and oceans is an accepted concept in the field of renewable energy. One major benefit of wave energy is that there is almost always at least some energy to be extracted from waves, thereby making wave energy potentially more reliable than solar thermal or wind energy and more environmentally acceptable in the sense of having lower visual, and potentially lower noise, impact on the local environment.

Whilst wave energy is relatively straightforward in concept, wave energy is, however, a complex energy medium.

The energy effectively 'rolls' through the seas and oceans, moving water particles in a circular or elliptical (depending on the depth of the water), oscillating motion (up and down "heave", and back and forth "surge"), relying on the fluidity and viscosity of the water to transmit the energy from one place to another. The water is constantly changing direction both vertically and horizontally and constantly changing in nature from potential (height) to kinetic (motion) energy and combinations in between.

Waves from seas and oceans are also not regular. While there may be an average period and average wave height at a given location and given time, there will still be variations from wave to wave, and within each wave.

This all poses a significant challenge to any wave energy converter (WEC) (sometimes called a wave energy conversion device or WECD) trying to extract the energy from the wave. To be efficient, the converter must 'couple' well with the wave (i.e. respond to or 'track' the wave motion) while at the same time resist the wave sufficiently to extract energy from the wave. The converter must also be robust to withstand wave forces, particularly adverse forces during storms, and be efficient with low energy losses, and be cost effective.

Many different WECs have previously been conceived. However, development of a cost effective converter that is also sufficiently efficient at extracting energy from the wave and also sufficiently reliable has, as yet, proved elusive.

Many WECs are very large and 'mechanical' in their construction and operation, resulting in high manufacturing, maintenance and/or operating costs, as well as difficulties in maintaining coupling with the wave due to the high mass and inertia of the converter. This results in low coupling (bandwidth) and poor real world performance.

Some WECs use relatively complex methods of wave energy capture, transmission and conversion to electrical energy, often progressing through consecutive energy conversions, from wave (fluid) energy to mechanical to hydraulic to rotational mechanical (turbine) to electrical energy. Each stage of conversion has an efficiency and system complexity cost, and leads to energy losses. Each stage of transmission has frictional losses, particularly when working with dense fluids (liquids) under high pressures and velocities such as hydraulics.

Some converters only focus on one directional component of the energy in the water (i.e. the vertical or horizontal component) and do not try to or effectively capture both vertical and horizontal components or accommodate the fluid nature of the energy flow in waves.

Other WECs use the oscillating water column (OWC) principal which relies on moving large quantities of water in and out of an open chamber or chambers, that movement pumping air back and forth over a turbine to turn a generator. These OWC converters often require the water to change direction and flow around non-streamlined edges. This increases friction and energy losses in the system and can introduce undue lag which can prevent good coupling with the wave. These converters also require a considerable amount of material in their construction, installation or anchoring, relative to the power output of the converter. The turbine is also exposed to salt laden air which can increase the cost to resist corrosion and the maintenance cost associated with keeping the blades clean to maintain performance Many WECs are also located offshore and on the surface of the ocean where extremely high forces are evident during adverse weather conditions. This increases the cost of the converter relative to the effective power output.

One field of WECs that has shown great potential can be characterised as 'membrane' power conversion converters, and more particularly membrane—pneumatic power conversion converters. These converters use a series of low cost and low inertia membranes or diaphragms to interact with the wave and efficiently transfer energy to a second fluid, usually a low inertia, low friction fluid such as air, which transmits the energy onto a turbine and electrical generator. These WECs can, in general, exhibit better coupling with the wave than other WECs because of low system inertia (fast response) and due to their reduced complexity, and have the potential to produce power more cost effectively over a broader range of wave conditions than other types of WEC discussed above.

Various wave energy converters are discussed in prior patent documents. For example, U.S. Pat. No. 3,353,787 to Semo in the 1960s proposed using water or oil as the second (transmission) fluid. The objective was to have a sturdy, sub sea converter better able withstand storms and harness a greater proportion of the available wave energy than other more complex converters at the time. Semo proposed a series of elongated chambers each with a flexible upper surface to pump an incompressible fluid (liquid) through check valves to a shore based fluid motor for energy extraction. Flow returned from the shore in the same circuit as the outflow but entered the chambers through small orifices.

U.S. Pat. No. 3,989,951 to Lesster in the mid 1970's discusses a submerged converter using a compressible fluid (such as air) as the transmission fluid to improve the responsiveness of the converter by reducing the mass and inertia of the transmission fluid. Lesster also provided for shorter flexible walled cells to improve the flexibility of operation and had the waves run along the length of the converter over each of the cells in turn. Separate in and outflow circuits, took air from each of the cells via check valves, and led to one or more turbo generators in a closed loop circuit providing a 'push pull' action on the air flow.

U.S. Pat. No. 4,164,383 to French in the late 1970's maintained the longitudinal (spine) design and orientation of the converter facing perpendicular to the wave front. This converter used a closed loop circuit with check valves and air as the transmission fluid but moved the converter to being a floating converter at or just below the surface of the waves like a long 'spine' and used a single flexible enclosure like a bag divided into compartments.

U.S. Pat. No. 4,375,151 to French in the early 1980's later disclosed control systems using the wave height and multiple closed loop circuits and turbo generators to improve the efficiency of energy extraction by reducing airflow pulsations and improve the converter's sea keeping, particularly pitch control.

U.S. Pat. No. 4,441,030 to Bellamy in the early 1980s discloses a similar floating 'spine' design but in a 'termination' mode i.e. parallel to the wave front, with flexible 'pillow shaped bags' mounted off the side of the spine to capture wave energy and reduce bag wear. The primary focus was on the bag design but this patent document also discloses the use of a single self rectifying turbine per cell rather than the previous closed loop circuits.

A later patent document U.S. Pat. No. 4,675,536 to Bellamy then progressed in the mid 1980s to a circular or ring design to reduce the size and cost of the converter, improve its sea keeping, and reverting to the option of using a series of membranes but now vertically positioned, rather than bags to capture the wave energy.

Development of membrane converters then appeared to be stagnant until developments revealed in US 2011-0185721 to Turner and US 2011-0162357 to Bellamy et al addressed the principle further in 2008. The Turner document focuses largely on a circular converter with an "S" shaped mounting edge for their membrane, and on other design features of the membrane (size, thickness, stiffness, reinforcement etc). Bellamy et al also stayed with a circular converter (or 'endless spine') but introduced a combination of membranes and oscillating water columns to the one converter. The objective being to increase the effectiveness and 'bandwidth' of the converter (i.e. coupling with the wave) by engaging with the both the heave (vertical) and surge (horizontal) components of the wave energy. Bellamy et al also reverted back to the non-return valve, single directional airflow (closed loop circuit) feature of Lesster, French and to some extent Semo.

U.S. Pat. No. 7,554,216 to Winsloe and WO 2007/057013 to Rasmussen both disclose oscillating water column (OWC) converters with multiple cells and a closed circuit airflow system using check valves feeding into a high pressure manifold, onto a turbo generator, and returning via a low pressure manifold. Both converters are floating OWC converters and are fully exposed to adverse wave conditions.

Alternatively, it is desirable of the present invention to provide a wave energy converter (WEC) better able to harness available wave energy than the aforementioned known converters.

With the aforementioned in mind, it is desirable of the present invention to overcome the difficulties of such converters by preferably providing a sub sea wave energy converter better able withstand storms.

Alternatively, it is desirable of the present invention to provide a wave energy converter with improved operational efficiency compared with known wave energy converters.

SUMMARY OF THE INVENTION

With the aforementioned in view, one aspect of the present invention provides a wave energy converter (WEC), including a body portion and at least one flexible membrane bounding at least part of a volume of a fluid, a substantial portion of the at least one membrane inclined from vertical providing a flow smoothed way for wave energy to travel over the WEC whilst deforming the at least one membrane towards the body to compress the fluid, the inclination of the at least one membrane assisting conversion of potential and kinetic energy of the wave to pressure within the fluid.

A further aspect of the present invention provides a wave energy converter (WEC), including a body portion and at least one flexible membrane forming at least part of at least one cell volume for pressurised fluid, the at least one membrane inclined from a lower portion to an upper portion thereof to allow a wave impinging on the WEC to flow over the at least one membrane and forces from surge and heave of the wave to deform the at least one membrane towards the body to compress the fluid in the at least one volume.

The WEC according to the present invention converts energy from a wave flowing over the membrane(s) of the WEC to pressure (energy) within one or more volumes of fluid in the WEC that is then able to be harnessed as useful energy. The WEC having the inclined membrane(s) couples with the wave efficiently.

The flow smoothing may provide a guide for the wave or wave energy over the WEC.

Preferably, for a vertical cross section through the WEC, a length of the cross section of the membrane is substantially the same as a length of a cross section of a surface of the body or face bounding the cell or volume. This allows the membrane to overlay onto the body surface or face when the membrane is fully deformed or compressed to the body or face.

The WEC may include at least one port, preferably provided at or adjacent the upper rearward portion of the respective cell. When wave pressure higher than the pressure of the fluid within the cell volume impinging against the membrane causes deformation of the membrane towards the face, the pressurised fluid is forced out of the cell via the at least one port at or adjacent the upper rearward portion of the respective cell.

The body may include at least one face respectively opposed to one or more of the at least one flexible membrane such that a respective flexible membrane is deformed or deformed by force of an external wave towards the respective opposed face.

The at least one flexible membrane may deform progressively from the lower forward portion to the upper rearward portion towards the body.

An alternative aspect of the present invention provides a wave energy converter (WEC), including a body portion and at least one cell, each said cell defined at least in part by a flexible membrane and an opposed face, the respective flexible membrane and face providing a volume for a pressurised fluid within the cell, the flexible membrane deformable towards the face by external force from a wave on the membrane to thereby force the fluid out of the cell via at least one port, wherein, wave pressure higher than the pressure of the fluid within the cell volume impinging against the respective flexible membrane causes deformation of the membrane towards the face A further aspect of the present invention provides a wave energy converter (WEC), including a body portion and at least one cell, each said cell defined at least in part by a flexible membrane and an opposed surface, wherein, for a vertical plane through the cell the length of the curve of the membrane cut by the plane is substantially the same as the length of the curve of the face cut by the same plane.

Another aspect of the present invention provides a wave energy converter (WEC), including at least one cell comprising a body portion and a flexible membrane, the membrane and body portion providing a volume for a pressurised fluid within the cell, the flexible membrane deformable towards the body when the wave pressure impinging against the membrane is higher than the pressure of the fluid within the cell to thereby force the fluid out of the cell via at least one port, and the flexible membrane deformable away from the body when the wave pressure impinging against the membrane is lower than the pressure of the fluid within the cell to thereby force the fluid into of the cell via at least one port, the body portion and or the membrane being shaped in a smooth, streamlined manner The term wave energy converter (WEC) used in relation to the present invention in this specification encompasses a single cell wave energy conversion device, a multi cell wave energy conversion device, combinations of single and multi cell wave energy conversion devices, and such wave energy conversion devices applied to wave energy conversion systems incorporating additional components, such as electricity generating equipment, turbines, pumps, desalination systems and control valves.

At least one embodiment of the present invention provides a wave energy converter (WEC) that, in use, converts energy fluctuations in a wave of one fluid (typically water) to energy fluctuations in another fluid (typically air) and subsequently onto a power take off converter, such as a turbine, and onto a generator, preferably for the production of electricity.

The wave energy converter may include one said cell or cells. Multiple such cells may be rigidly attached to one another or form in a single unit to form the converter as a multi cell unit. The cells may be arranged in linear arrays to form a single WEC. Multiple such arrays may be configured into a multi WEC to form a combined converter, such as having two or more linear arrays of WECs. One or more seal may be provided in joins between supply/return conduits of adjacent WEC cells when connecting multiple discrete WECs together to form a large multi cell WEC, such as having a cast multi cell body.

The membrane may be a single layer material, or may be multi-layered or laminated, and may be reinforced or incorporate reinforcement.

Preferably the membrane is a non porous membrane. The membrane acts to separate the two fluids (the external fluid carrying the wave action and the internal fluid within the cell) to transfer the energy from the external fluid to internal fluid. This occurs when the pressure on one side of the membrane is higher than the other, and provides a very cost effective, low inertia and responsive way to extract and transmit energy from the wave.

The converter may include a number of adjacent cells, each with its own membrane.

The converter is arranged and configured to be sympathetic to the 'rolling' motion of a wave and to progressively extract energy from both the vertical (heave) and horizontal (surge) components of the wave energy as the wave passes across the converter.

The converter may preferably be anchored under its own weight or otherwise attached to the seabed. For example, the converter may be concreted to the seabed or may be attached to raised supports, a platform or foundations attached to the seabed, or may be self-weighted through geo-textile bags or filled (such as sand filled) internal voids. The wave energy converter might be raised from the seabed to tailor operation of the converter to the prevailing weather and location conditions. For example, where the seabed is particularly uneven or rocky, it may be preferably to raise the converter off the seabed to avoid needing to excavate a large amount of rock. Also, if the marine habitat is sensitive, raising the converter from the seabed can avoid disturbance to marine habitats, flora and fauna, as well as positively create a safe haven habitat below the converter.

The WEC of the present invention may preferably be located below the mean still water surface, preferably on the seabed in 2.5 to 15 m of water.

The WEC of the present invention is preferably a near shore submerged, pneumatic, attenuation type WEC, but can also be adapted to an offshore submerged or semi-submerged deep water application or fitted to a breakwater.

According to at least one embodiment of the present invention, each cell may be configured with the rolling action of wave motion in mind and in a manner that the wave energy can smoothly interact with and roll over the converter while the converter extracts energy from the wave. The wave energy converter may have a streamlined front, much like an aerofoil, that smoothly interacts with the impinging wave, preferably slowing it, and transferring some of the surge motion (i.e. the flow towards the converter), to heave (i.e. flow above the converter) increasing the pressure against the membrane as the wave approaches or passes overhead. Pressure against the membrane may be provided by a dynamic pressure front leading the motion of the wave as the wave approaches the wave energy converter. Dynamic pressure can be understood to be a combination of pressure due to the kinetic energy and potential energy of particles in the wave. Thus, there is always some water pressure against the membrane when submerged, and that pressure is dynamic i.e. changes with changes in kinetic and potential energies in the wave.

A rear of the converter may include a curved or rounded portion (such as a curved or rounded rear face or upper corbel portion). This helps to control return flow of the water over the converter, accentuating the reverse heave and surge effect to create higher velocities and lower pressures above the membrane as the water particles return in their oscillatory motion during a wave trough. This allows the converter to act in a smooth push-pull pumping action as the water passes back and forth overhead to increase extraction of energy from the wave whilst reducing disturbance, loss or friction to the wave motion, minimising unnecessary forces acting on the device.

In effect, the WEC of the present invention acts in a flow smoothed or streamlined manner (somewhat like an aerofoil) to smoothly interact with and allow the wave motion to be guided over the WEC whilst maximising energy extraction by converting surge to heave as the wave first impinges on the membrane and progresses over the converter. Then as the wave trough passes over the converter the wave flow assists return of the membrane ready for the next wave action. As the trough of the wave advances to pass over the WEC, reduced external pressure is applied to the membrane compared with the higher external pressure caused by the wave at its peak. This lower pressure associated with the trough is lower than the average wave pressure such that the external pressure is lower than the pressure within the cell, thereby causing the membrane to reinflate ready for the next wave.

Each membrane of each cell may also be configured in a streamlined manner that is sympathetic to the wave motion. Being flexible, the membrane can react to the pressure from or leading the wave and thus deform as the wave motion approaches, moves over, against and around it, extracting the maximum amount of energy from the wave to the fluid within the cell with the minimum of unnecessary disturbance, loss or friction to the wave motion.

By minimising the level of unnecessary disturbance, loss or friction to the wave motion, the converter minimises the unnecessary forces acting on the converter and reduces the structural and foundation strength required, particularly during adverse weather conditions. By submerging the wave energy converter below the surface of the water, slamming forces of a wave against the wave energy converter are reduced thereby allowing structural and foundation strength to be correspondingly reduced. This is particularly beneficial during adverse weather conditions.

The combination of these features creates an efficient, low inertia, responsive and cost effective wave energy conversion converter.

As expressed above, each cell may form part of an individual unit or may be a sub part of a larger structure containing multiple said cells.

One or more forms of the present invention may be configured as V or chevron format. Preferably each 'limb' ('arm'/'leg') of the V or chevron includes one or multiple said cells.

Preferably, the apex of the V or chevron may be oriented towards or to face the direction of the oncoming waves i.e. open water sea/ocean oriented (ocean oriented), and the limbs (arms or legs) of the V or chevron extending away from the apex towards the shore such that the waves approach the apex first and the V or chevron and each arm/leg obliquely e.g. at an angle less than 90°.

The V or chevron arrangement may be reversed such that the apex points towards the shore and away from the waves, such that the limbs of the V project away from the apex towards open water (Shore oriented).

The included angle of the V or chevron may be substantially or approximately 90°, but may range from 10° to 180° (180° providing a linear array). More preferably the angle may be between 45° and 120°.

The open water (e.g. sea or ocean) orientated apex better suits those sites more likely to experience significantly adverse wave events by allowing the waves to encounter the apex first and 'peel down' the arms/legs of the converter and then shed excess wave energy into clean water off the end of the arms/legs.

The Shore orientated apex variant concentrates excess wave energy towards the centre (apex) of the converter which offers greater conversion efficiencies in light seas.

One or more embodiments of the present invention may be configured in an open curve or arc orientated either towards the ocean with the open side towards shore (convex) or with the open side towards open water (concave).

These combined features cause the wave energy to concentrate and roll down the legs of the converter(s)

One or more embodiments of the present invention may be configured in a single spine arrangement. For example, the converter including a longitudinal array of the cells such that each cell is adjacent another to receive an impinging wave. Preferably the spine has an axis at an angle to the direction of the waves, preferably of between 10° and 80° and more preferably between 30° and 60°.

One or more embodiments of the present invention may be configured as a semi-submersible option (i.e. floating and tethered but not mounted directly onto the ocean floor), preferably in a circular or annular configuration to accept omnidirectional wave spectra typically associated with deep water locations. Thus, where waves may impinge on the converter from various directions over time, a circular or annular arrangement is considered beneficial in order to maximise average wave action rather than the converter being linear and therefore more directional. Such an embodiment could be configured around another structure in the sea/ocean, or provide support for another structure, such as a wind turbine, oil or gas rig, or channel marker. The WIC may be formed as a quadrilateral i.e. two chevron or four linear arrays joined together. Other shapes are considered to fall within the scope of the present invention, such as hexagonal i.e. three chevron arrangements or six linear arrays, or combinations thereof. Embodiments of the present invention may include multi sided WECs. Such multi sided WECs may have an odd or even number of sides. All or a number of the sides may include one or more WEC arrays or cells. For example, a WEC may be 6,8,10,12 sided, with some or all of those sides incorporating cells or arrays of cells. The cells may be on one or both faces of a WEC (i.e. wave facing and facing away from the prevailing wave).

Selection of the location and orientation of the WEC of the present invention is a function of the installed location and wave resource characteristics (usually due to prevailing wind, water depth, seafloor angle compared to mean water surface level, and tide conditions). In all configurations the intent is to enable the wave to smoothly interact with the converter.

The membrane may be attached to a body of the converter. The body may also form or include a face against which the membrane preferably sits when not inflated. For example, the body may be formed of one or more cast or moulded portions, such as concrete or plastic or fabricated from steel. The face may be formed of a curved section of the body, preferably integrally formed by casting or moulding as part of the body), or may be a shaped rigid or semi rigid face liner attached to the body to form a desired profile.

One or more ends of the respective membrane, particularly in an array arrangement with single or multiple cells or chambers, could be form a semicircle, arc or spline, that is either in or out of plane with the inclination plane, with a membrane that has a domed like shape which will utilise either the elastomeric properties and stretch or be geometrically shaped such that the elastomeric strain/stress is reduced.

The membrane may be attached to the body adjacent upper and lower portions of the body of the converter. When the cell contains pressurised fluid (such as pressurised air) sufficient to overcome exterior pressure (such as from the water in which the converter may be submerged) and 'inflate' the membrane, the membrane curves outwards towards the exterior fluid (e.g. the seawater). The frontal curve or 'face' of each cell membrane may preferably take on an overall streamlined shape, such as a concave or 'catenary' shape or near catenary shape, a domed, inverted catenary, 'S' or similar shape in profile or section. Hydrostatic forces may vary this shape i.e. in addition to the tension and gravity forces acting on the membrane. The membrane may therefore not be perfectly smoothly concave.

A visualised chord of such a catenary may be inclined at an angle to horizontal (chord angle), such as between 0° and 90°, and more preferably between 20° and 60°, and more preferably 30° +/−15°.

Breakwater installations of the WEC of the present invention may have a shorter foot length (footprint length), and greater cord angles and preferably a larger catenary to cord length ratio.

Where bottom mounted, deeper water installations of the WEC of the present invention may have a longer foot length (longer footprint), lesser chord angle, tending towards flat, and lesser catenary to cord length ratio.

When the volume within the cell is pressurised sufficiently to overcome external pressure (e.g. static water pressure from being submerged), the membrane transforms to its maximum inflated state, which creates a convex curved face (in a domed, inverted catenary, 'S' or similar shape), with the chord of the curve inclined at the same 30 deg or so angle to the horizontal as the 'face' (face) of the body of the cell. When the membrane conforms to the cell's face (face) profile or any smooth basin formed into or on the body structure, it takes on that form so that it does not get damaged by wave action in the event of heavy seas whereby the cells can be deflated and the membranes protected by being 'pressed' onto and conforming to the corresponding face or face.

Each converter, whether having one or more cells, such as each limb (arm/leg) of the converter (and group of cells as a whole), may be pivoted to allow the chord angle to change with respect to the oncoming wave, allowing optimisation of the device according to the strength, (wave height and surge etc.) and direction of the wave.

Depending on the relative internal and external fluid pressures and motions of the wave at the time, the membrane may form an intermediate profile of an elongated S when viewed in side profile as the wave pressure depresses firstly the forward lower portion of the membrane. This may be between the upper and lower membrane attachment points of the cell membrane to the cell body.

Effective width (lateral length) of the membrane preferably matches the effective width (lateral length) of the cell face or wall. This provides for a membrane and fixing arrangement that allows the membrane to conform to the cell face and avoids inducing unnecessary stresses in the membrane.

In operation, once the cell's volume is fully swept or the membrane is completely deflated, the membrane lays flat on the cell face or wall or basin without any induced stresses, pinches or folds. This enables the converter to survive extreme wave events in the fully deflated state without inducing extreme stresses in the membrane.

Fluid, such as air, from each cell either:

passes through a set of one way (check) valves for each cell into a (high pressure) manifold combining air from all the cells and onto one of more uni-directional turbines (and subsequently to drive one or more electricity generators). With the air travelling back via a second (low pressure) manifold and second set of check valves to the same or other cell, or passes through a duct with a bi-directional turbine in it to a common reservoir (or manifold), refilling the cell from the reservoir once the pressure in the cell drops below the pressure in the reservoir.

The location of the at least one port of each cell to communicate the air from the cell to the check valves (or bidirectional turbine) enables the cell to maximise sweep of its volume on the deflation stroke and reinflate smoothly, without stiction (static friction whereby the cell membrane can stick to the opposing face of the cell and not allow fluid (e.g. air) to enter the cell to reinflate it).

The valving may form part of the face of the body. For example, the face on the body may include valving inserted or mounted therein. A grill or cover may be provided over the valving and preferably providing part of the face.

This may be achieved by locating the at least one port of each cell integrally with the body of the converter. The at least one port may be cast into the body.

The at least one port of each cell preferably includes inlet and outlet ports. Alternatively, a single port may communicate with check valves controlling output air flow from the cell and return inflow into the cell via the one port.

Preferably one or both of the supply port or check valve (high pressure) and return port or check valve (low pressure) is/are positioned adjacent an uppermost limit of the cell face or basin just below the upper membrane restraining edge.

The converter is preferably configured such that a longitudinal extent of each arm/leg in the direction of the waves is equal to the average wavelength of predominate energy waves in the particular location. This arrangement takes into account that the leg is at an angle to the wave due to the preferred V or chevron formation. This typically results in each leg preferably being 40 m to 80 m long. However, other lengths are envisaged and will be specified depending upon the prevailing wavelength of the waves for a given location. This configuration allows the air flow from the cells to work in a 'source and sink' mode. As such, one cell is under the peak of a wave (maximum pressure) and pumping air from the cell via the at least one port, and another cell is under the trough (or minimum pressure) of the wave and accepting air back from the reservoir or low pressure manifold via the at least one port.

The converter is preferably arranged with cells in line horizontally so there is an even average air pressure across the cells.

Preferably average pressure in each cell can be raised or lowered by a pressure control system. For example, a pneumatic system may be provided to maintain optimum cell pressure as the water depth changes with tidal or other longer term effects and depending on the optimal conditions for the prevailing or current sea state.

According to one or more preferred embodiments of the present invention, one or more turbines (and one or more electricity generators driven by the respective turbine(s)) may be driven by the air flow from the cell(s) fed from the high pressure manifold and discharging to the low pressure manifold. The turbine(s) and electrical generator(s) may be mounted adjacent or in the apex of the V or chevron so that airflow streams from each arm/leg are combined. Alternatively, separate turbine-generator combinations may be mounted towards or at the end of each leg/arm or anywhere along the leg length or elsewhere.

Load on the generator(s) (or electrical power output) or performance of the turbine(s) can be varied based on actual or predicted or expected wave height, form and period information so that the pressure differential and flow across the turbine(s) can be controlled or optimised and the resultant turbine speed(s) optimised for maximum electrical energy production.

The preferred streamlined design of embodiments of the present invention and/or the catenary form or corresponding profile of the membrane or cell face can also be adapted to traditional oscillating water column converters to convert them to membrane converters, eliminating salt laden air from passing over the turbine.

The converter may also be used for the production of a pressurised third fluid (typically water for storage or sea water—for desalination), by exchanging the electrical generator for at least one pump.

Whilst the wave energy converter according to various aforementioned embodiments and forms of the present invention is defined within this specification as including a system for wave energy conversion, for the avoidance of doubt, a further aspect of the present invention provides a wave energy conversion system incorporating one or more wave energy converters according to one or more embodiments of the present invention described herein.

The rear face or surface of the membrane within the cell and/or the corresponding face or surface of the body of the cell that contact each other when the cell is deflated may be non-smooth. The surface may have undulations or irregularities, and/or an embossed or raised pattern, to help relieve stiction during refilling of the cell.

A rear of the WEC may include a concave, convex, multi-curved or straight inclined rear face (such as a wedge shape). Particular arrangements can be selected to suit prevailing wave and location conditions (such as depth of water and prevailing wind strength).

A Concave or straight rear to the WEC or WEC body can help reduce eddy currents at the rear of the WEC, which may help reduce erosion of the seabed/seafloor at the rear. The rear may alternatively or in addition include one or more of the cells with the respective at least one membrane to extract energy from returning waves e.g. returning from land, a beach, cliff or headland or from a manmade structure such as a breakwater or harbour wall. Thus, the WEC may be double sided in terms of cells so that the device extracts wave energy from an oncoming wave and a return wave.

The membrane may be attached to the body by a spline or bead and clamp arrangement. The spline or bead may be circular or oval in cross section. For example, the material of the membrane may be folded over a spline or may have a hem or sleeve into which a spline is inserted. The splined edge of the membrane is then clamped, such as by putting the splined edge into a channel or groove and applying a fastener to clamp the splined edge into the channel or groove. Alternatively, the membrane may be sealed to the body by a clamp ring around at least part of the external periphery of the membrane. Alternatively, the membrane may be sealed to a support and then mounted to the body. Thus, the membrane and support may be provided as a discrete component.

The membrane end(s) and/or connections, such as arc, semi-circle, curves and splines can have tangency between and/or be tangential to the main top and bottom connections. This avoids a sharp corner or abutment of top and bottom sides for the membrane connecting to the body.

A further aspect of the present invention provides a method of controlling or optimising fluid pressure within at least one cell of a wave energy convertor (WEC) or within the WEC system, the method including increasing or reducing fluid pressure within each said cell and/or within a low pressure or high pressure conduit(s) and/or manifold of the system.

Preferably the fluid pressure is increased or decreased relative to at least one reference pressure value. The or each reference pressure value may be an average of fluid pressure determined within the or each respective said cell and/or within the low and/or high pressure conduit(s) and/or manifold of the system.

Average pressure may be determined, at least in part, by averaging various pressures within a cell or across a number of cells at a particular time (simultaneous average pressure) or across one or more cells over time (temporal averaging).

Preferably the method includes controlling or optimising pressure within the cell(s) to maintain optimum cell pressure as a function of water depth changes with tidal or other longer term effects, and preferably depending on the optimal conditions for the prevailing or current sea state. Thus, as effective water depth increases above the cell(s), pressure within the cell(s) may be increased to balance the increased external pressure from the water, and as water depth decreases, pressure within the cell(s) may be decreased to balance the decreased pressure from the water. In this way, performance and output from the cell(s) and/or system may be optimised for a required output or demand on the system.

Also, in the event of actual or predicted deterioration in sea conditions, pressure within the cell(s) may be reduced to prevent damage to the membrane. Pressure reduction can, if required, reduce to zero or atmospheric pressure such that the membrane(s) is/are pushed flat by water pressure and do not function until the cell(s) is/are internally pressurised to reinflate the cell(s).

Embodiments of the present invention will hereinafter be described with reference to the accompanying drawings, of which:

BRIEF DESCRIPTION OF THE DRAWINGS

FIGS. 1a to 1k show, in sequential steps, wave action on the membrane for a fully swept cell volume over a complete wave sequence for a WEC according to an embodiment of the present invention.

FIGS. 1m to 1w show, in sequential steps, wave action on the membrane for a fully swept cell volume over a complete wave sequence for a WEC, and showing representations of wave flow lines, according to an embodiment of the present invention.

FIGS. 1l and 1x show a WEC according to an embodiment of the present invention with the membrane completely deflated.

FIGS. 2a to 2k show in sequential steps wave action on the membrane for a half swept cell volume over a complete wave sequence for a WEC according to an embodiment of the present invention.

FIG. 2l shows a membrane of a WEC according to an embodiment of the present invention, the membrane completely deflated.

FIG. 5 shows a cross section through a WEC with a single radius curvature cell face according to an embodiment of the present invention.

FIGS. 6a to 6d show various arrangements for a dual radius curvature cell face according to alternative embodiments of the present invention.

FIGS. 7a to 7c show various arrangements for a triple radius curvature cell face according to alternative embodiments of the present invention.

FIGS. 8a to 8d show alternative arrangements of WEC with different chord angle alignments in respect of oncoming waves, according to alternative embodiments of the present invention.

FIGS. 9a to 9d show alternative mooring/anchoring arrangements according to embodiments of the present invention.

FIGS. 10a to 10c show sections through alternative forms of WEC according to embodiments of the present invention.

FIGS. 11a to 11d show sections through alternative forms of WEC and including at least one valving or porting option according to embodiments of the present invention.

FIGS. 12a and 12b show an alternative valving or porting option for a WEC according to an embodiment of the present invention and a close coupled turbine adjacent the cell according to an embodiment of the present invention.

FIGS. 13a and 13b show a multi cell WEC and membrane positions according to an embodiment of the present invention.

FIGS. 14a to 14c show a single cell longitudinal bank form of WEC according to an embodiment of the present invention.

FIGS. 15a to 15c show a multi cell longitudinal bank form of WEC with integrated flexible divider walls according to an embodiment of the present invention.

FIGS. 16a to 16c show a multi cell longitudinal bank form of WEC with diaphragm cell dividers according to an embodiment of the present invention.

FIGS. 17a to 17c show a multi cell longitudinal bank form of WEC with fixed divider walls between adjacent discrete cells according to an embodiment of the present invention and consistent with FIGS. 13a and 13b.

FIG. 30a shows a wind turbine mounted on a floating WEC. FIG. 30b shows a seabed/seafloor mounted submerged version with wind turbine tower projecting upwards therefrom. FIGS. 30c and 30d show an alternative embodiment of a WEC and wind turbine combination according to a further embodiment of the present invention.

DESCRIPTION OF PREFERRED EMBODIMENTS

Figure 3:
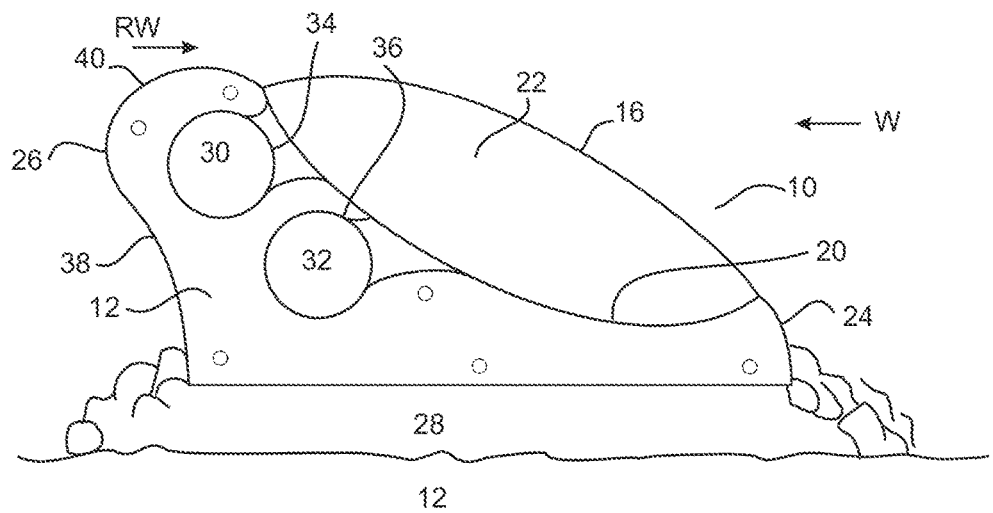
FIGS. 3 and 4 show alternative mounting arrangements of wave energy converters (WECs) according to embodiments of the present invention.

FIGS. 1a to 1k show a wave energy converter (WEC) 10 on a seabed or sea floor 12, resting on the seabed under its own weight. The sequential steps show the action of a wave 14 on a flexible membrane 16 of the WEC over a complete wave sequence for a WEC according to an embodiment of the present invention. The wave has a peak 14a and trough 14b. The WEC has a body 18 with an integral face 20. It will be appreciated that the face can be separately applied to the body, such as a discrete face member. The face member and membrane may be pre attached to each before mounting to the body. Alternatively, the membrane may be connected to the body by other attachment means. The membrane and face are sealed watertight with respect to the exterior wave such that they define a variable volume cell 22 therebetween. The volume of that cell is increased by a pressurised supply of a fluid within the WEC sufficient to resist pressure of the wave at a trough 14b in the wave form so that the membrane inflates and is under tension. As the wave peak 14a approaches and passes over the WEC (FIGS. 1a to 1f), surge and heave pressure within the wave increases and the membrane is compressed towards the face, normally from a lower forward portion, such that the cell volume is compressed and fluid within the cell is squeezed upwards gradually progressing rearward and upward with respect to the cell's rearward and upward inclination.

FIGS. 1m to 1w show the same operation of the WEC 10 as shown in FIGS. 1a to 1k, though including wave flow lines. These wave flow lines represent the general flow and movement of the wave over the WEC 10. It will be appreciated that the membrane 16 begins deforming before the peak 14a of the wave 14 is directly above the WEC 10. This is due to the pressure front leading the wave as the wave peak 14a approaches the WEC.

It will be appreciated that the cell in this embodiment is inclined or angled rearward with a lower portion forward of its upper portion such that the lower portion encounters the force of the wave first and the wave pressure progresses rearward thereby forcing the cell volume to constrict from the lower portion towards to upper portion.

It will also be appreciated that due to the fluid nature of the energy in the wave and the flexible nature of the membrane, the membrane may not be compressed evenly and orderly, yet the volume within will still be generally compressed from the lower portion to the upper portion. The face 20 is generally the same length and width as the membrane and a length, curvature or shape generally matching but opposite to the length, curvature or shape of the membrane when the membrane is at a fully inflated state (see FIG. 1a). When the membrane is fully compressed to the face, as in FIG. 1f, the membrane lies flat against the face. As the wave continues to pass over the WEC (see FIGS. 1g to 1k) and pressure decreases on the membrane (i.e. the peak of the wave 14a has passed), return pressure re-inflates the membrane from the upper rearward portion progressing down to the lower forward portion ready for the next wave.

FIGS. 1l and 1x show the membrane fully retracted or pressed back onto the face. This allows the membrane to be kept safe in the event of rough sea conditions, tidal surges or large waves that might otherwise over pressure the cells or cause damage to the membrane, or even potentially shift the WEC from its anchorage. This feature allows the WEC to be de-energised from the wave resource in the event of a WEC component failure to prevent further damage to the faulted component or associated components. This feature allows the WEC to be de-energised to enables maintenance activities to be undertaken safely.

FIGS. 2a to 2k show in sequential steps wave action on the membrane for a half swept cell volume (c/w FIGS. 1a to 1k and 1m to 1w) over a complete wave sequence for a WEC according to an embodiment of the present invention.

Figure 4:
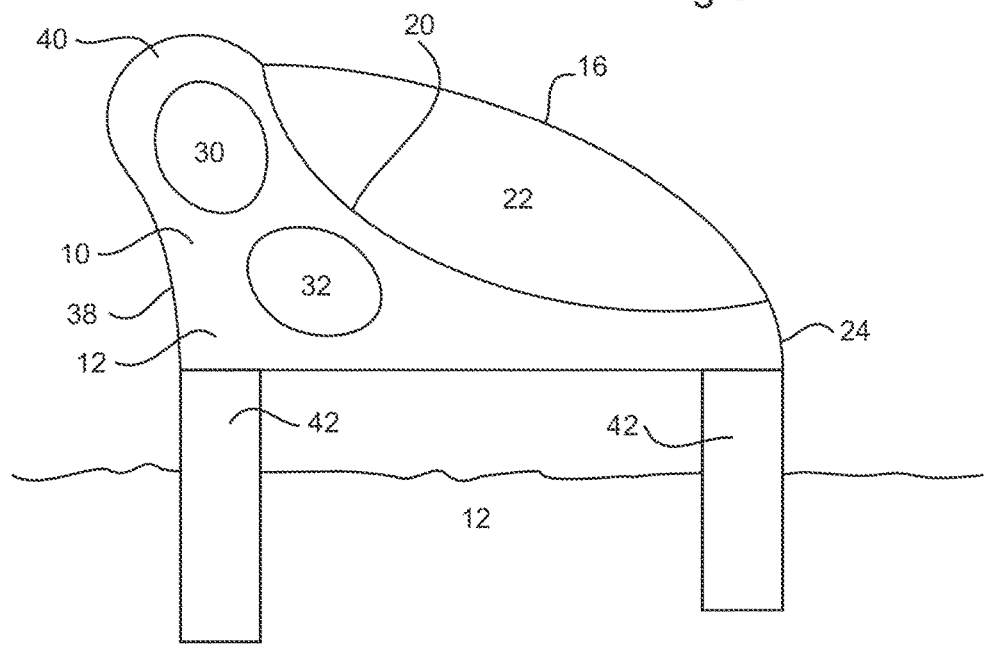

FIGS. 3 and 4 show a WEC 10 and some alternative mounting and configuration arrangements therefore according to embodiments of the present invention. The WEC 10 has a body 18. A cell volume 22 is formed by a membrane 16 and a cell face 20. The WEC forms a generally wedge shaped or streamlined aerofoil shape. In cross section, the WEC is lower in height at the front 24 than at the rear 26 with respect to impinging waves in direction W.

In FIG. 3, the WEC is anchored in sand or concrete 28 to the seabed 12. The WEC has supply (outlet) 30 and return 32 conduits each connected by respective supply (outlet) 34 and return (inlet) 36 ports communicating with the cell volume 22.

Valving can be provided to control flow into the supply conduit and out of the return conduit with respect to the cell. A single port may be provided with fluid flow from the cell to the supply conduit and return from the return conduit into the cell. A pair of one way valves may be provided. Alternatively a bi-directional turbine may be provided to harness the fluid flow in both directions. In this configuration, a rear face 38 of the WEC and an upper rear corbel 40 help to control return wave RW flow back over the WEC. It will be appreciated that the curve of the membrane 16 when fully inflated and the curve of the face 20 can share a common length 42 such that the membrane lies comfortably over the face when fully deflated.

FIG. 4 shows the WEC 10 mounted on piers 42 raising the WEC from the seabed bathymetry conditions so that the device is levelled and closer to the mean still water level. The piers help the WEC to sit at the correct depth in the water to meet with required specification and performance criteria from the WEC in relation to the depth of water and general wave conditions.

FIG. 5 shows a cross section through a WEC 10 of the present invention with a single radius curvature cell face 20. A chord 42 is common to the membrane 16 and face 20 such that the membrane can lie flat against the face when fully deflated or pressed back onto the face. Thus, each of the sections 16a, 16b, 20a,20b are of the same general length.

FIGS. 6a to 6d show various arrangements for a dual radius curvature cell face 20 according to alternative embodiments of the present invention. The cell face has a first curved portion 44 and a second curved portion 46. The membrane has a section length equivalent to the length of the combined first and second curved portions.

FIGS. 7a to 7c show various arrangements for a triple radius curvature 44, 46, 48 cell face 20 according to alternative embodiments of the present invention.

FIGS. 8a to 8d show alternative arrangements of WEC with different chord angle 42 alignments at 90°, 45°, 30° and 0° in respect of oncoming waves W, according to alternative embodiments of the present invention. It will be appreciated that other angle alignments can be used, which can be selected based on the style of WEC deployed and prevailing location (direction, water depth etc) and wave conditions.

FIGS. 9a to 9d show alternative mooring/anchoring arrangements according to embodiments of the WEC 10 of the present invention.

FIG. 9a shows seabed anchored 50 version, for example, using concrete, sand, geotextile bags or rocks, or combinations thereof. FIG. 9b shows a footing or pile 52 mounted version.

FIG. 9c shows a footing or pile mounted version whereby the WEC is pivotably attached 54 to the pile/footing towards the front of the WEC. This allows the WEC to be hinged forward to adapt to changes in prevailing wave conditions by altering the angle β to tilt the WEC forward. Variable ballast may be employed to control lift or lowering of the WEC about the pivot 54. The ballast can be water, such as seawater pumped into or evacuated out of a chamber or conduit through the WEC.

An alternative version shown in FIG. 9d has a tethered mooring using a tether 58 attached to a tether point 60 at one end and a mooring 62 at the other. In such an arrangement, the WEC can be ballasted so as to be buoyant within the water, preferably neutrally buoyant at a preferred depth. This can be achieved by controlling the variable ballast 56.

FIGS. 10a to 10c show sections through alternative forms of WEC according to embodiments of the present invention. FIG. 10a shows a convex curved rear version, FIG. 10b shows a sloping rear version and 10c a concave or corbelled version, FIG. 10d a convex version. The different versions of rear are provided for different wave and location requirements. The various rear options act to modify return wave flow and thereby can be used to maximise WEC efficiency for a given application and location.

FIGS. 11a to 11d show sections through alternative forms of WEC and including at least one valving option according to embodiments of the present invention.

FIG. 11a shows dual or twin ports or ducts. An outlet or supply conduit 64 and an inlet or return conduit 66 are provided. The cell volume 22 communicates with the conduits via one or more ports to/from the cell volume and valving 68. The valving shown in figure 11b has alternate one way valves 70,72. The uppermost valves 70 supply fluid from the cell volume to the supply conduit. The lower valves 72 return fluid to the cell volume from the return conduit. Sections A-A and B-B are shown respectively in FIGS. 11c and 11d. These show the outlet port(s) 74 from the cell and the inlet port(s) 76 to the cell volume.

FIGS. 12a and 12b show an alternative valving option for a WEC according to an embodiment of the present invention. A bi-directional turbine 80 is provided in a single port 82.

FIG. 12b shows a view into the port and the turbine from the cell volume.

FIGS. 13a and 13b show a multi cell WEC and membrane positions according to an embodiment of the present invention. A bank or array of WEC cells is provided as a single unit. A single body 18 houses multiple cells. It will be appreciated that each cell may be formed or cast in the single body, or discrete cell body portions may be formed and then connected together to form the single body. The supply and return conduits 64, 66 may be integral to the body portion(s) or may run externally of the WEC in individual conduits in the form of pipes.

FIG. 13b shows part of the section A-A of FIG. 13a, with the left-hand membrane partially compressed, the centre membrane fully inflated and the right-hand membrane completely deflated.

FIGS. 14a to 14c show a single cell longitudinal bank form of WEC according to an embodiment of the present invention. The single cell clearly has no divider walls.

FIGS. 15a to 15c show a multi cell longitudinal bank form of WEC with integrated flexible divider walls 84 according to an embodiment of the present invention. The divider walls between cells are shared between adjacent cells i.e. one cell wall between each adjacent pair of cells.

FIGS. 16a to 16c show a multi cell longitudinal bank form of WEC with diaphragm cell dividers according to an embodiment of the present invention. Thus, each cell is a discrete thing having its own walls and membrane. FIGS. 17a to 17c show a multi cell longitudinal bank form of WEC with fixed, preferably rigid, divider walls between adjacent discrete cells, each with its own membrane, according to an embodiment of the present invention.

Figure 18:
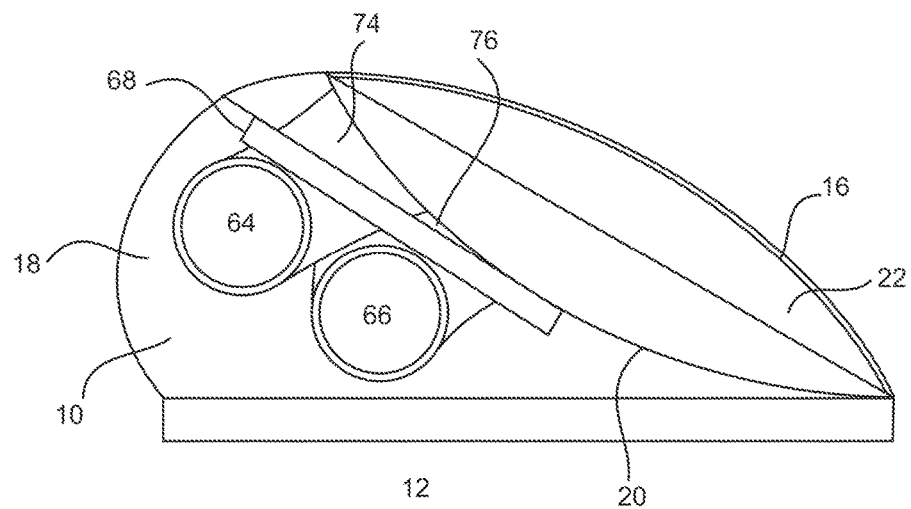
FIG. 18 shows a section through a WEC showing a valving arrangement according to an embodiment of the present invention.

FIG. 18 shows a section through a WEC showing a porting and valving arrangement according to an embodiment of the present invention. The WEC 10 includes a body portion 18 with integral conduits 64, 66 for respective supply and return flow of fluid. Flow from the cell volume 22 is through an outlet port 74 through the valving 68 into the supply conduit 64. return flow is from the return conduit 66 via the valving 68 into the cell volume 22. The valving includes separate outlet valves and return one way valves. The valving can be provided as a cartridge component that is replaceable. Preferably the valving is accessible by removing an access port cover at a rear of the WEC 10 and preferably in-line with the axis of the valving 68. The valving 68 is released and then withdrawn rearward and upward. The replacement valving is then is inserted in a downward and forward motion, then locked in location and the access port cover reinstated. The face and/or the membrane may seal to the body in a watertight or near watertight manner sufficient to allow efficient operation of the WEC with minimal leakage into or out of the conduits.

The wedge shaped profile of the WEC 10 encourages the wave to ramp up on approach to the WEC and then ride over the WEC with minimal disturbance whilst maximising wave surge to wave heave conversion and thereby maximising wave energy conversion as the membrane compresses.

Figure 19:
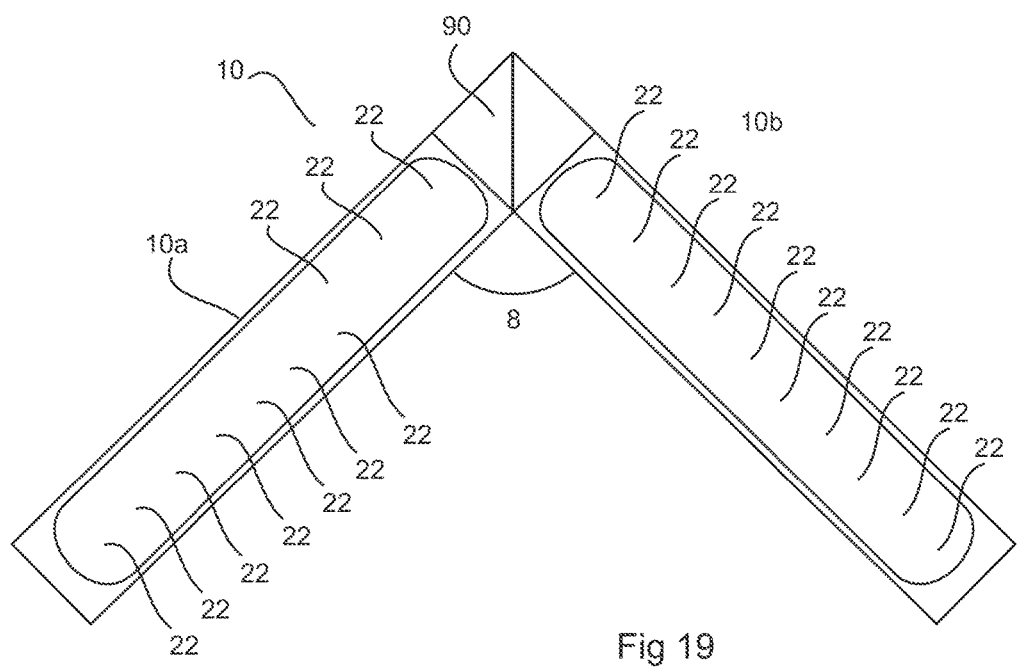
FIG. 19 shows a V or chevron configuration of two linear arrays or banks of multi cells forming a combined WEC arrangement according to an embodiment of the present invention.

FIG. 19 shows a V or chevron configuration of two linear arrays or banks of multi cells forming a combined WEC arrangement according to an embodiment of the present invention. Angle γ between the two limbs (arms/legs) 10a, 10b of the WEC can be set at a desired value such that the arms/legs are angled with respect to each other to suit prevailing location and wave needs. The angle may be variable, such as by powered or manual adjustment between the two limbs. Power generation and/or pumping equipment and/or angle adjustment equipment may be provided at the juncture 90 between the two limbs.

Figure 20:
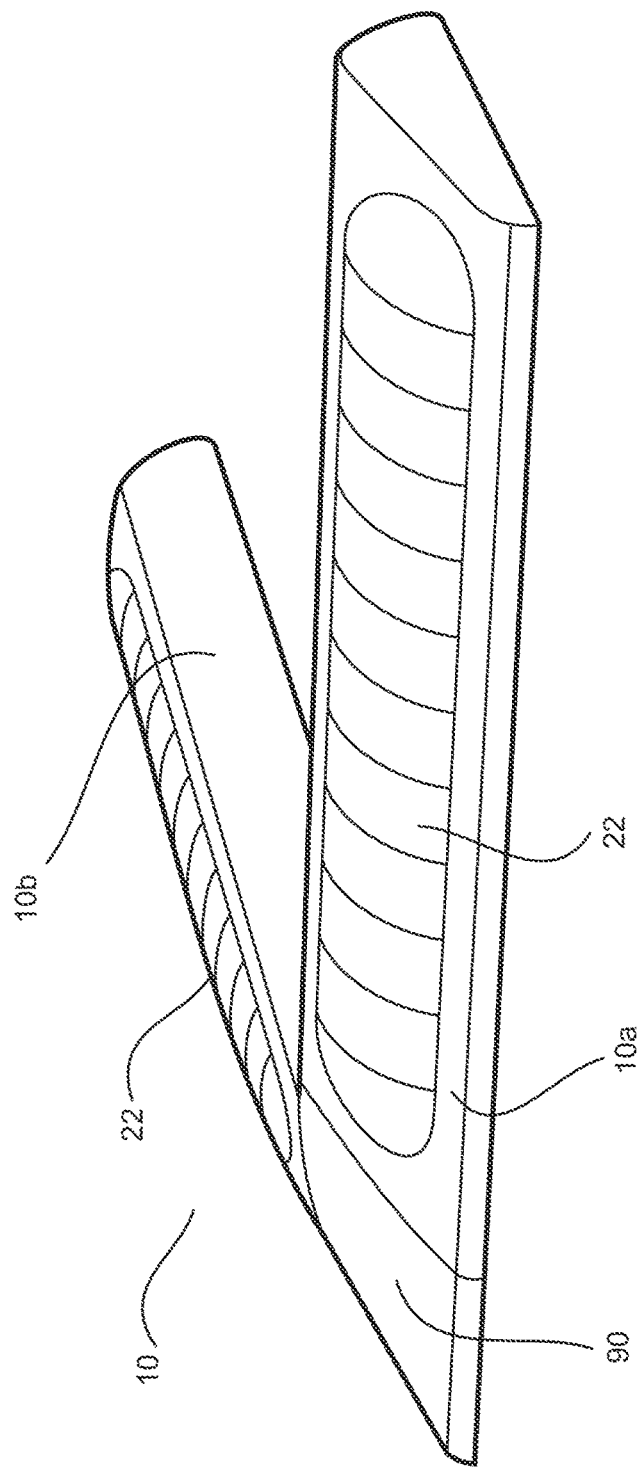
FIG. 20 is a perspective of V or chevron configuration of two linear arrays or banks of multi cells forming a combined WEC arrangement according to an embodiment of the present invention.

FIG. 20 is a perspective of V or chevron configuration of two linear arrays or banks of multi cells forming a combined WEC arrangement according to an embodiment of the present invention.

Figure 21:
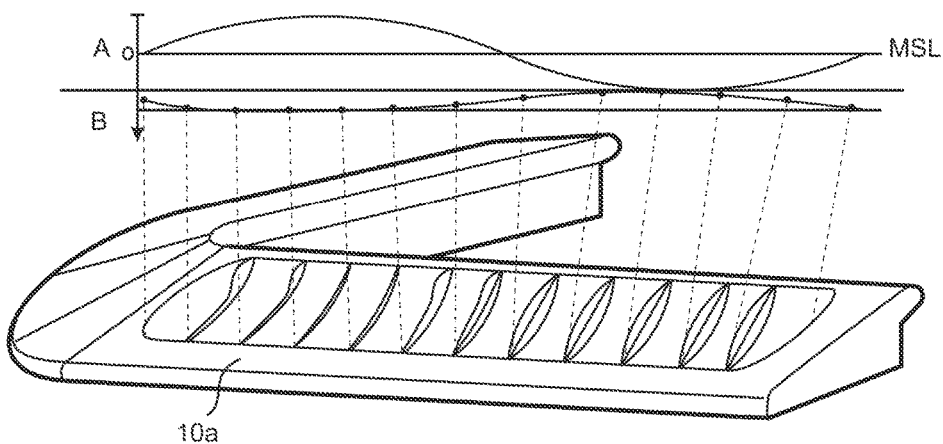
FIGS. 21 to 23 show cell membrane displacement sequences with respect to an impinging wave according to embodiments of the present invention.
Figure 22:
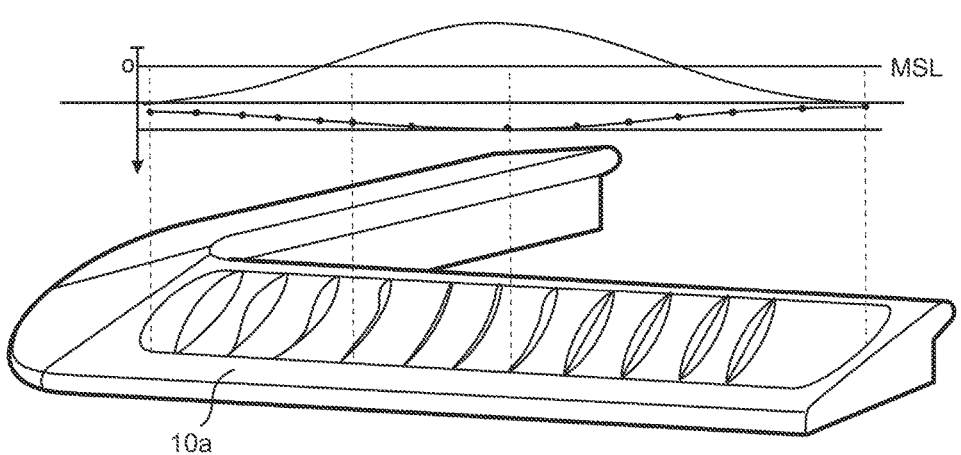
Figure 23:
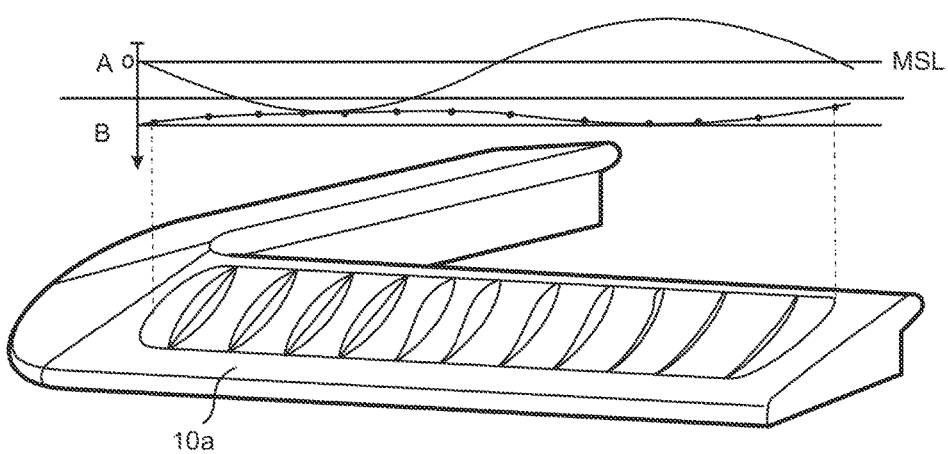

FIGS. 21 to 22 show cell membrane displacement sequences with respect to an impinging wave according to embodiments of the present invention. The upper graph A for each figure represents wave height and pressure. The lower graph B for each figure represents cell vertical displacement of the membrane of each cell. Each figure also shows a representation of the pattern of actual cell membrane displacement for each sequence across the WEC limb 10a.

Figure 24:
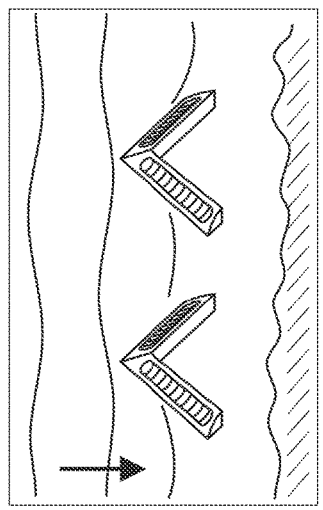
FIGS. 24 to 26 show various arrangements of linear array or bank configurations of WEC for near shore application according to embodiments of the present invention.
Figure 25:
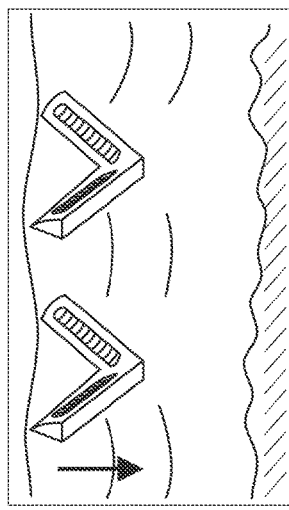
Figure 26:
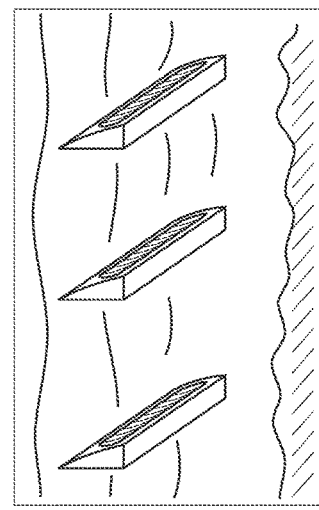

FIGS. 24 to 26 show various arrangements of linear array or bank configurations of WEC for near shore application according to embodiments of the present invention.

FIG. 24 shows a near shore ocean facing apex with the limbs pointing towards the shore. FIG. 25 shows a near shore, shore facing apex with the limbs of the WEC pointing towards open water.

FIG. 26 shows a single limb or spine version of the WEC near shore.

Figure 27:
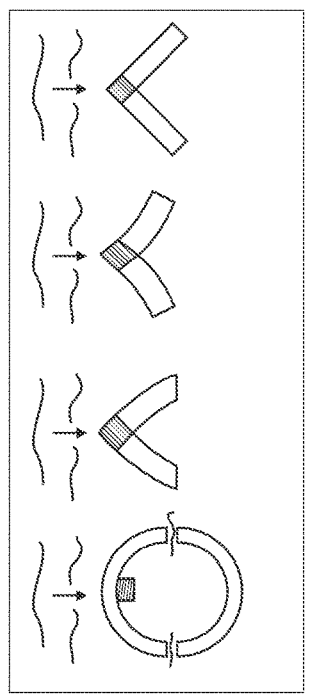
FIGS. 27 to 29 show various linear array or bank forms corresponding to the respective arrangements shown in FIGS. 24 to 26.
Figure 28:
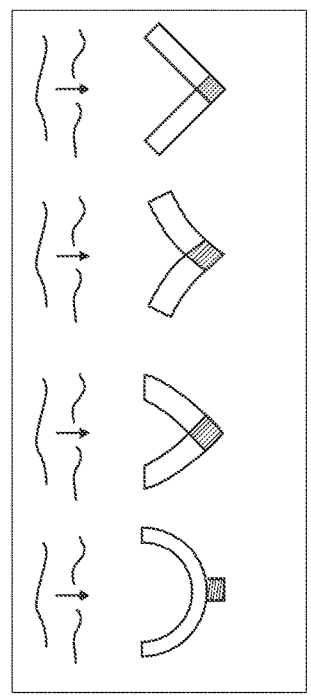
Figure 29:
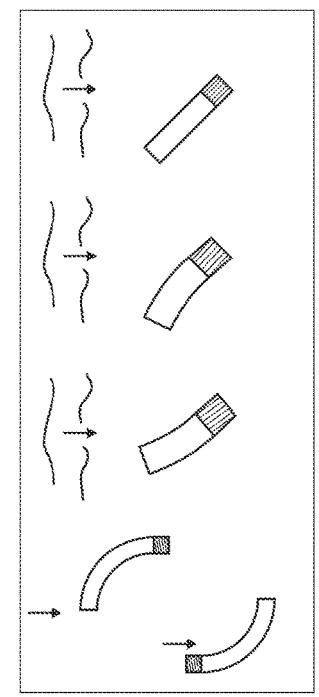

FIGS. 27 to 29 show various linear and non linear array or bank forms corresponding to the respective arrangements shown in FIGS. 24 to 26.

Figure 30:
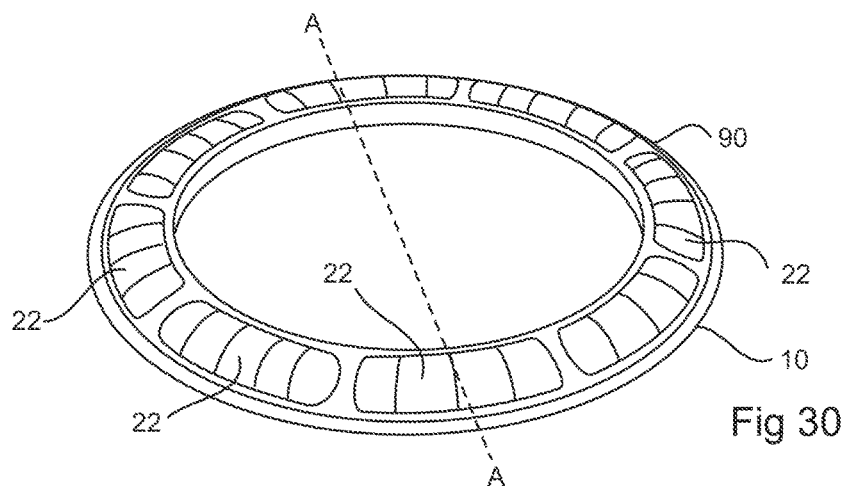
FIGS. 30 and 31 show deep water applications of the WEC according to embodiments of the present invention, with FIGS. 30s and 31s showing respective cross sections.
Figure 30S:
FIGS. 30a, 30b, 30c and 30d show alternative deep water applications of WECs according to embodiments of the present invention.
Figure 31:
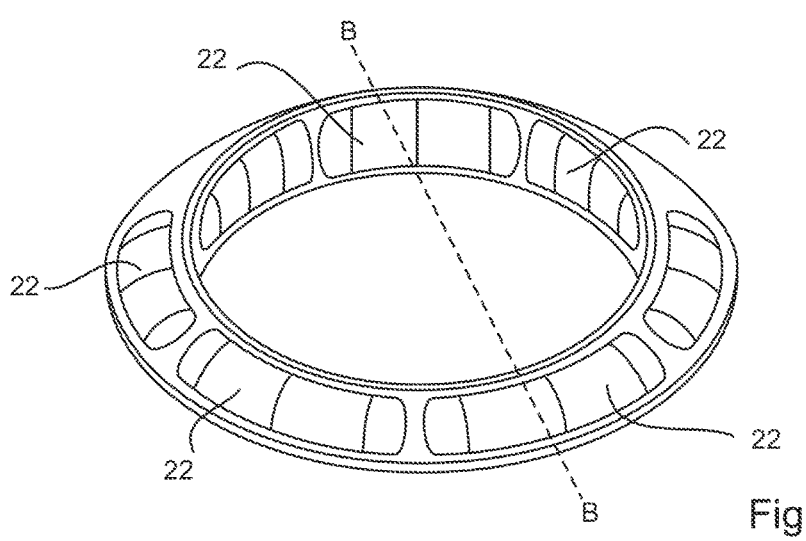

FIGS. 30 and 31 show deep water applications of the WEC 10 according to embodiments of the present invention. In FIG. 30, the annular array 90 of cells 22 of the WEC 10 allows for efficient conversion of wave energy from any direction. Thus, wave energy conversion over a period for different wave directions over a period of time can be averaged. Section A-A (FIG. 30s—'s' for section) of FIG. 30 shows a cross section of a general arrangement of the cells.

Figure 31S:
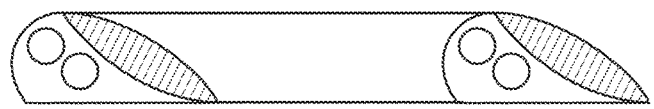

FIG. 31 shows an alternative embodiment of the deep water version of WEC with some cells internal to the opening through the annulus and other cells external to the opening. Section B-B (FIG. 31s—'s' for section) shows a cross section of a general arrangement of the cells.

The WEC embodiments in FIGS. 30 and 31 extract energy from waves first impinging on one side of the annulus to also extract energy from the wave as it passes across the annuls and impinges on the inside face of the annulus. Such deep water applications may be tethered floating applications either on the surface of the waves or neutrally buoyant below the surface of the waves, or rigidly mounted on a pylon, offshore wind turbine tower, oil or gas rig or other similar ocean or deep water device.

Figure 30A:
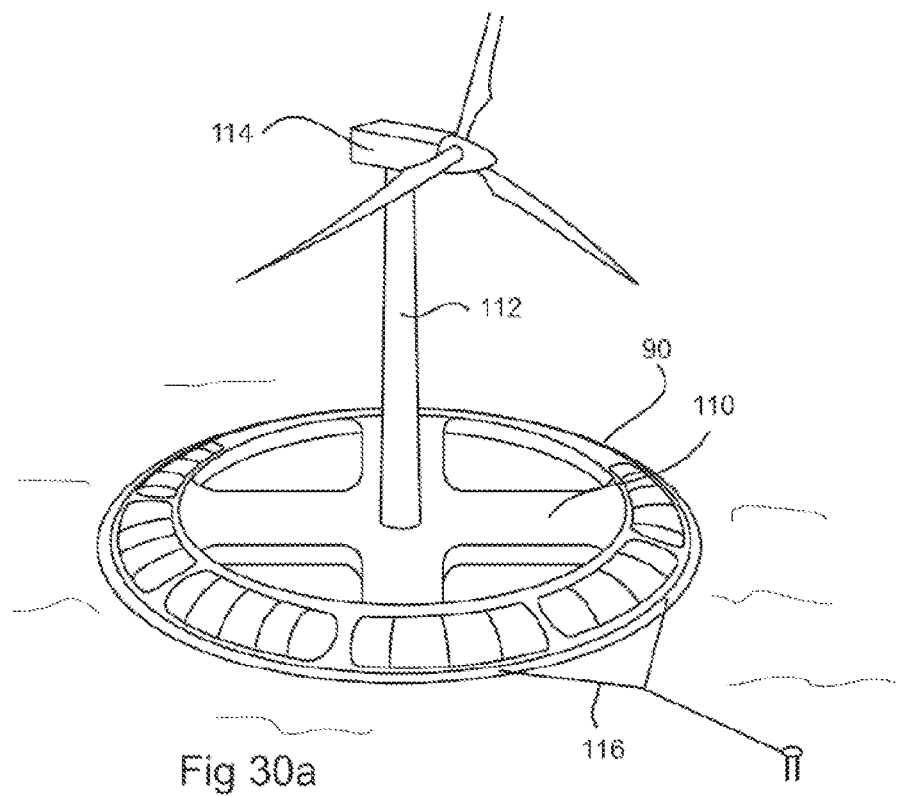
Figure 30B:
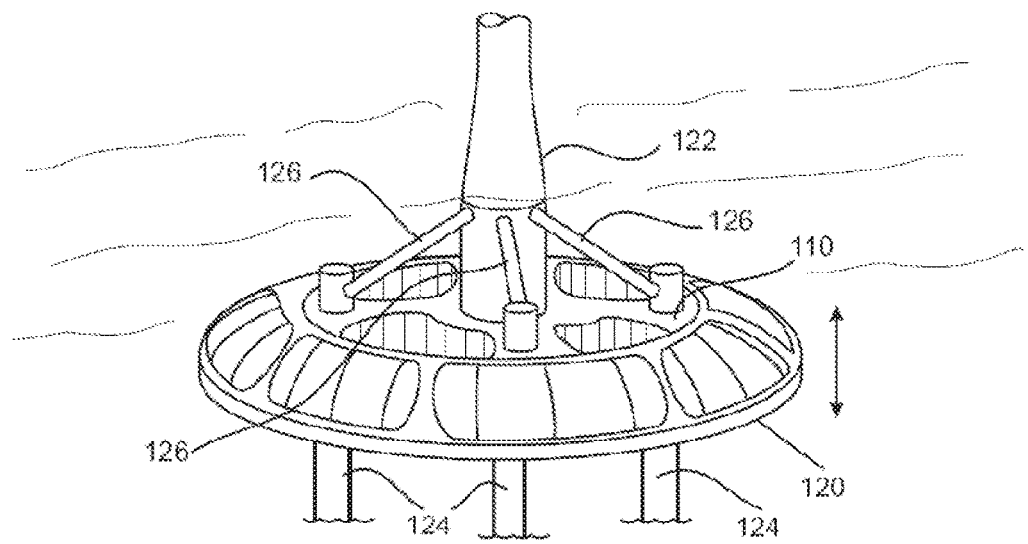

FIGS. 30a and 30b show alternative deep water applications of WECs according to embodiments of the present invention. FIG. 30a shows a wind turbine 114 integrated with a floating WEC similar to that shown in FIG. 30, though with a central (cruciform) support 110 for the mast 112 of a wind turbine 114. Other forms of support for the wind turbine, or other device, can be provided, such as a central single spar, a solid or mesh platform, or a framework. The WEC is tethered 116 to the seabed, allowing the WEC to float but not drift away. Electricity generated by the wind turbine may be used to power electrical equipment, such as pumps and control systems and safety systems relating to the WEC.

FIG. 30b shows an alternative version providing a seabed/seafloor mounted submerged WEC 120 with a wind turbine mast 122 projecting upwards therefrom. The WEC is mounted on supports 124 into the seabed/seafloor 126. The WEC may move up and down with respect to the seabed/seafloor to cater for changes in water depth and sea conditions, which allows the WEC to be optimised for prevailing sea/weather conditions, or to be lowered to the seabed/seafloor in the event of rough sea/weather conditions. A cruciform support 110 supports the mast, which itself can be braced by lateral supports 126.

FIGS. 30c and 30d show a deepwater application of a WEC according to an embodiment of the present invention. The WEC 10 is mounted to the mast 112a of the wind turbine 114a. In particular, FIG. 30d shows a vertical section E-E through the WEC 10 and mast 112a of the wind turbine 114a. The mast is embedded in the seabed/seafloor 12. The WEC is rotatable about the mast. Control of rotation can be effected by a winch 190 connected to each end of the WEC by one or more tethers 192,194. A single continuous tether (continuous tether 192+194) may pass around the winch pulley 190, or separate tethers may be provided 192, 194, each controlled to effectively lengthen or shorten to allow the WEC to rotate. This allows the WEC to be swung to face the prevailing oncoming waves to maximise wave energy conversion, or to be angled to control how much effect the waves have on the WEC i.e. to limit energy conversion, which can be especially useful in strong wave conditions when facing waves full on may be less than fully efficient due to the frequency, peak to trough height or forces from the waves. To allow for changes in water depth and/or wave height with respect to the mast, the WEC may travel up and down with respect to the mast. One or more guides, such as tracks, guide wheels, rollers etc. 198 may be provided on the mast, on the WEC or both. These allow the WEC to travel freely up and down or to be controlled to maintain a required position or depth.

Figure 32:
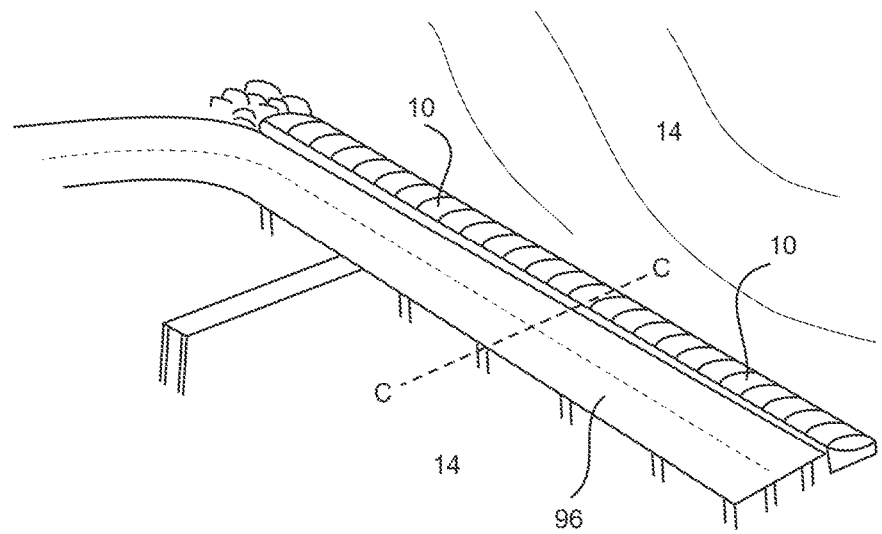
FIGS. 32 to 34 show breakwater and oscillating water column (OWC) applications of WECs according to embodiments of the present invention.
Figure 33:
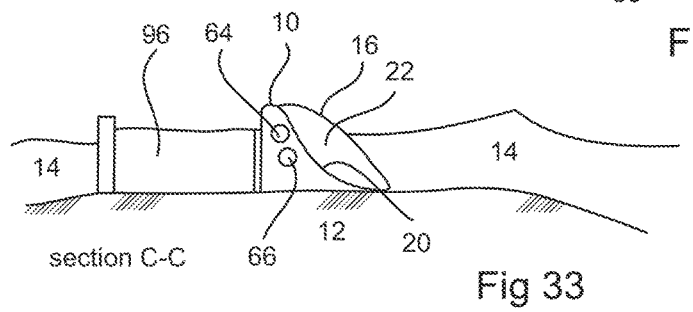
Figure 34:
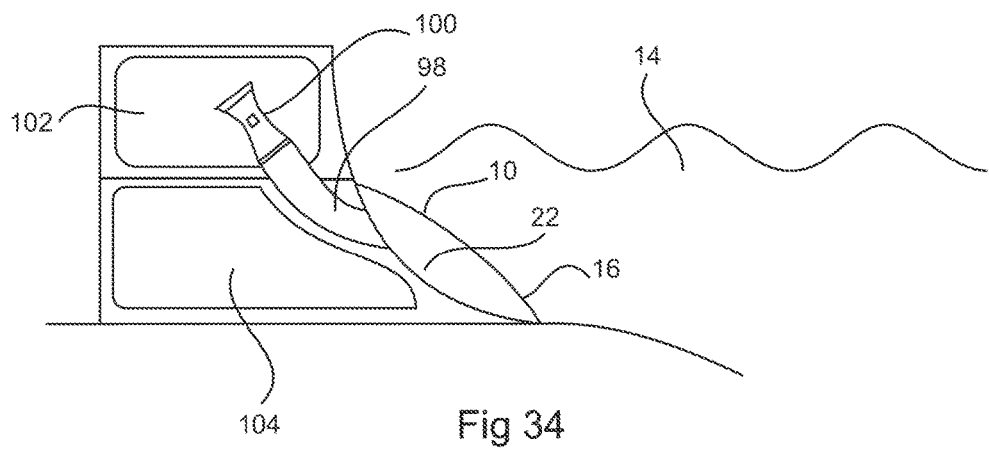
Figure 35:
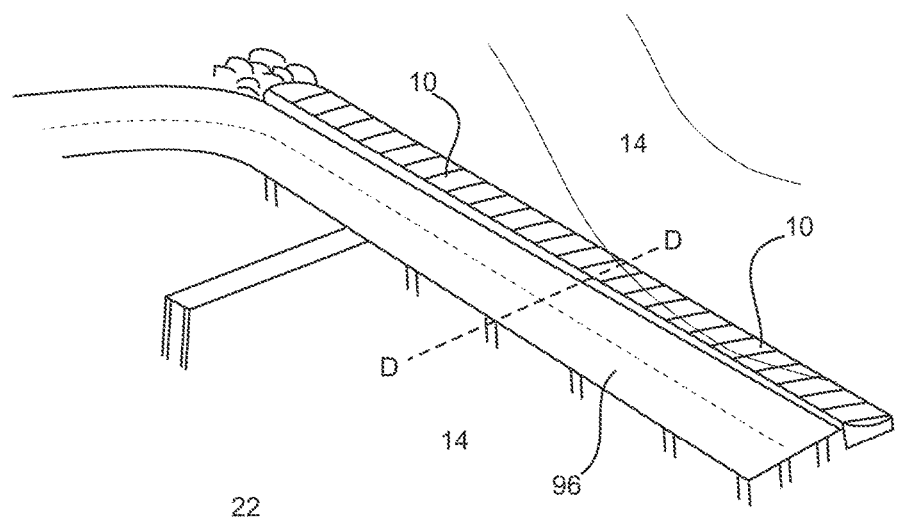
FIGS. 35 and 36 show an alternative embodiment of the breakwater WEC of FIGS. 32 and 33.
Figure 36:
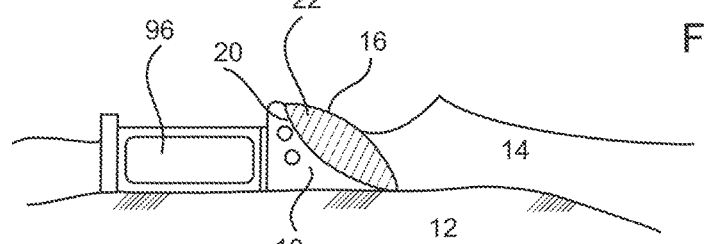
Figure 37:
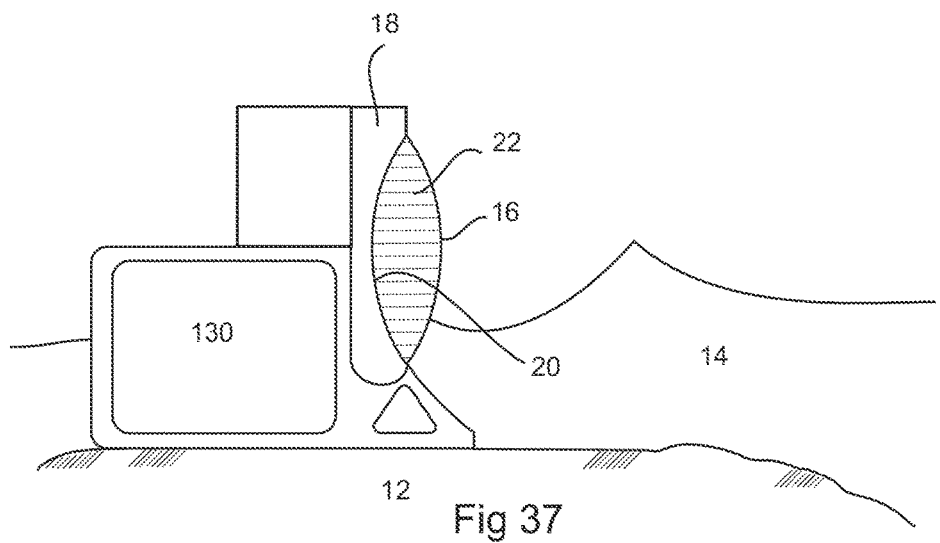
FIG. 37 shows a coffer dam type breakwater application incorporating a WEC according to an embodiment of the present invention.

FIGS. 32 to 34 show breakwater applications of WECs according to embodiments of the present invention. The WEC 10 is provided as a linear array or bank of cells positioned close to shore and forming an edge of a jetty 96 extending out into the water 14. The jetty may be a solid or near solid breakwater.

FIG. 33 shows cross section C-C through a breakwater and WEC 10.

A WEC 10 adapted for harsh conditions may be provided, as shown in FIG. 34. The WEC includes one or multiple cells 22 with respective one or more membranes 16. A single port 98 leads to a bi-directional turbine 100 and into an upper single supply and return conduit or chamber 102. A lower chamber 104 can be filled with ballast, such as water or concrete or rubble for additional weight to prevent the WEC moving in rough sea or tidal surge conditions. It will be appreciated that separate supply and return conduits may be provided, with associated one way valving.

Figure 38:
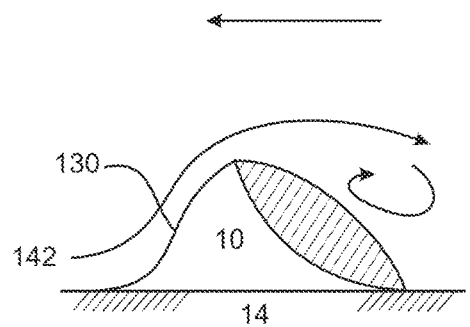
FIGS. 38 to 42 show alternative forms of a WEC according to embodiments of the present invention.
Figure 39:
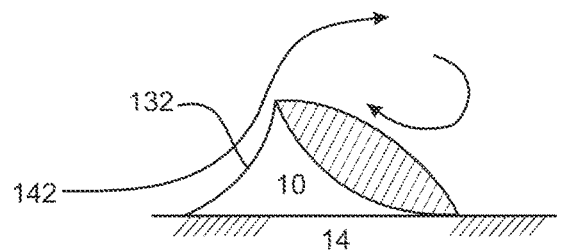
Figure 40:
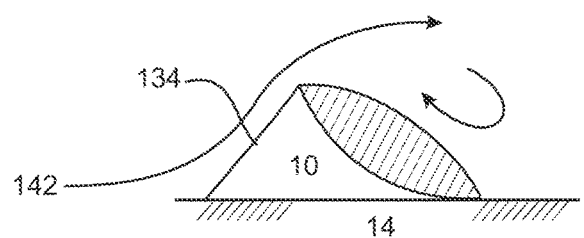
Figure 41:
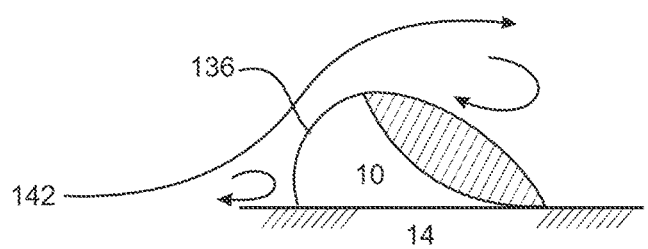

As shown by way of example in FIGS. 38 to 40, the wave energy converter 10 may have alternative forms of rear wall arranged to direct return flow 142 of water. For example, FIG. 38 shows a double curved or 'S' shaped rear 130, whereas FIG. 39 shows a concave rear 132, and FIG. 40 a straight (or wedge or 'triangular' when referring to the general body shape of the WEC 10) shaped rear 134. These alternative forms of rear can be employed when a convex curved rear might result in eddy currents immediately at the base of the rear adjacent the seabed/seafloor. Such eddy currents 140 from the return flow 142 might potentially cause erosion of the seafloor 14 adjacent the rear of the WEC, as shown in FIG. 41.

Figure 42:
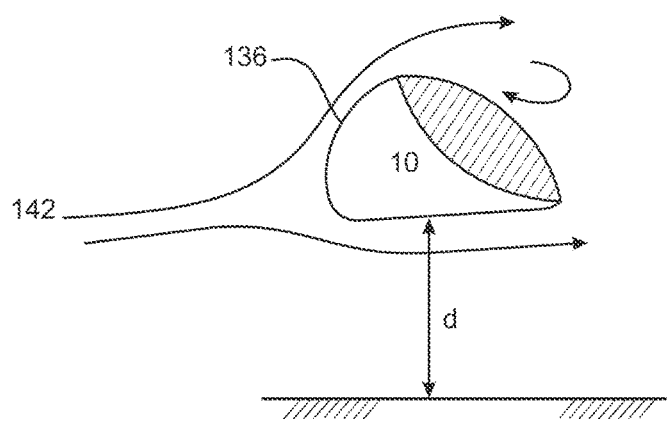

FIG. 42 gives an example of a WEC with a convex rear 136 and that is raised off the seafloor a distance 'd' to allow some of the return flow to pass under the WEC and thereby avoid such eroding eddy currents.

Figure 43:
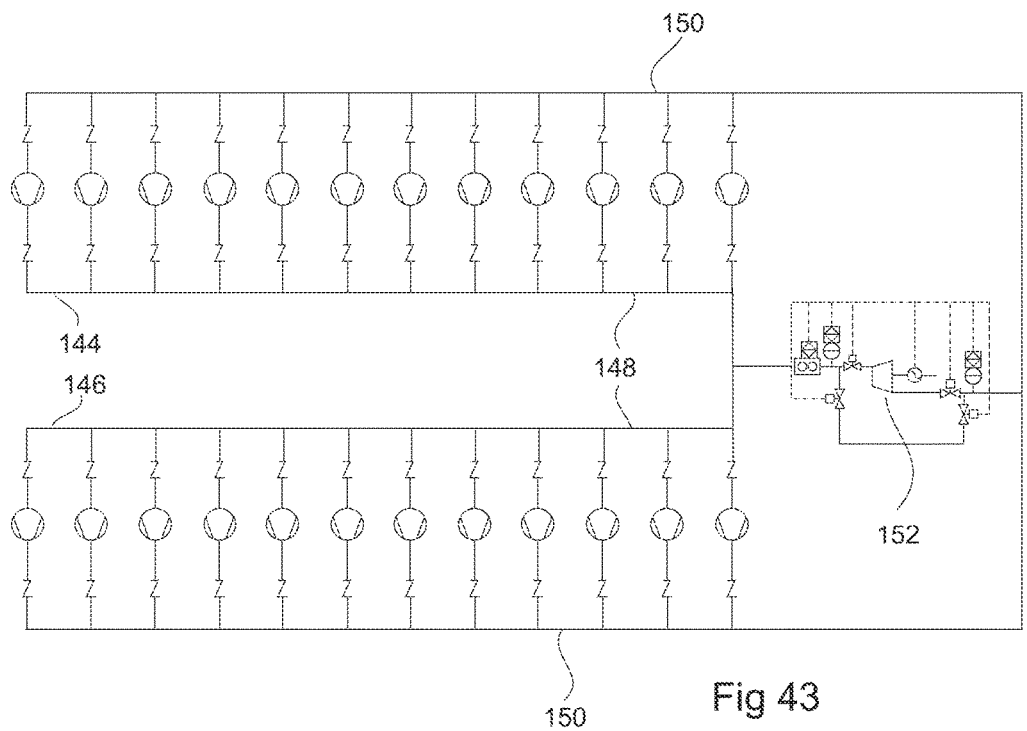
FIGS. 43 to 46 show various arrangements of process, piping and instrumentation of systems for controlling flow of a secondary fluid from one or more cells of WECs through one or more turbines to convert wave energy to harnessed energy according to embodiments of the present invention.

FIGS. 43 to 46 show alternative arrangements of process and instrumentation diagrams (P&ID) of the circuits for directing the converted wave energy via a secondary fluid through one or more turbines. In particular, FIG. 43 shows a double diaphragm bank of cells 144,146 with common manifolds 148, 150 and a single (shared) turbine 152. This arrangement can be used in a V bank configuration with closed lop dual pneumatic circuit (rectified flow) and a single axial turbine coupled to an electric generator.

Figure 44:
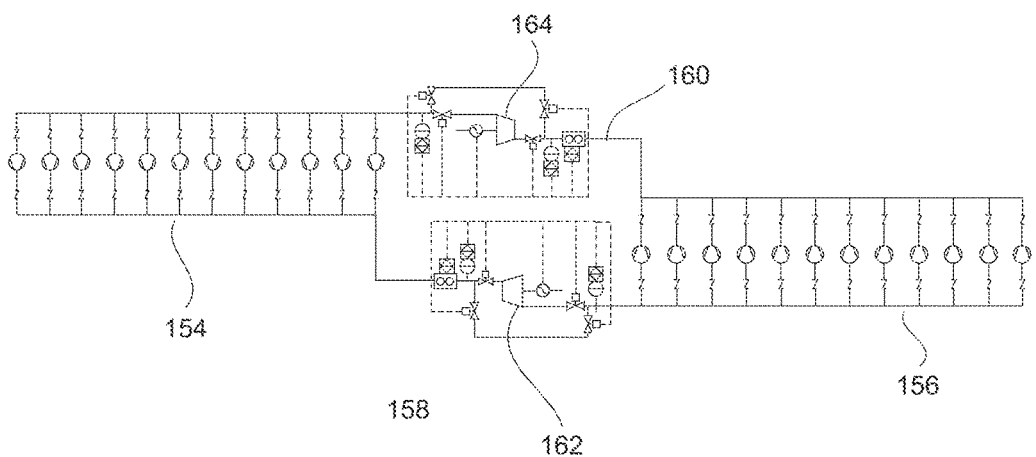

FIG. 44 shows a double diaphragm bank of cells 154,156 but with cross flow manifolds 158, 160, each connected to a respective one of a pair of turbines 162, 164. This also relates to a V configuration of banks of cells, with closed loop dual pneumatic circuit (rectified flow) and dual axial turbines coupled to electric generators.

Figure 45:
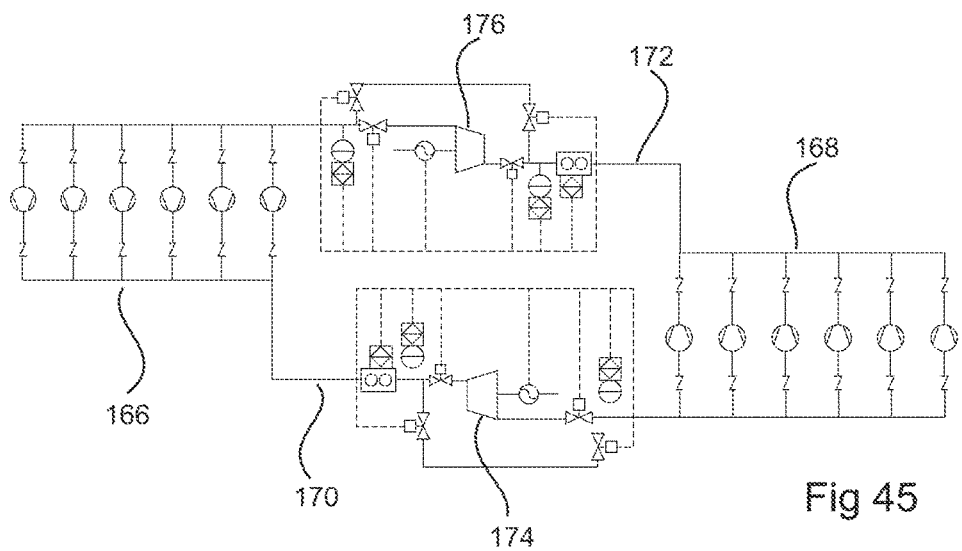

FIG. 45 provides an arrangement of WEC with a single diaphragm bank of cells 166, 168 with cross flow manifold 170, 172 and double turbines 174, 176. This single bank arrangement has closed loop dual pneumatic circuit cross flow (rectified flow) and dual axial turbines coupled to electric generators.

Figure 46:
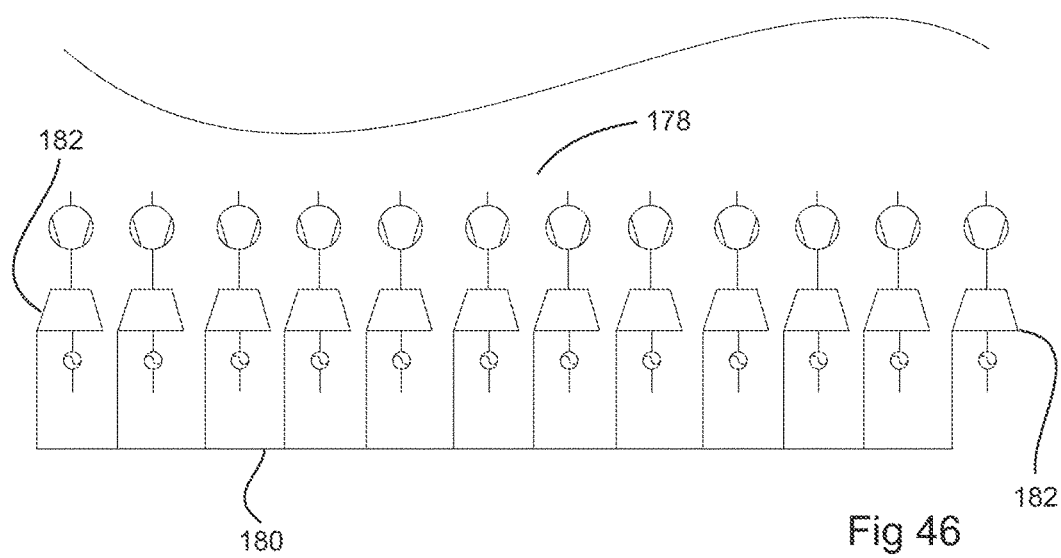

FIG. 46 shows a single diaphragm bank of cells 178 with single manifold 180 and bi-directional turbines 182. This provides open loop ducting (applicable to all configurations). A rectifying turbine and generator are mounted in the port between diaphragm cell and common transfer manifold. Multiple turbines per diaphragm cell is also possible.

It will be appreciated that performance of the wave energy convertor cell(s) and or system can be controlled or optimised to suit prevailing or predicted sea conditions or to match a required level of performance or demand.

Fluid pressure within one or more of the cells, or within the system including the cell(s), can be increased or decreased as required. For example, fluid pressure within a low pressure or high pressure conduit(s) and/or manifold of the system can be varied.

Preferably the fluid pressure is increased or decreased relative to at least one reference pressure value. Fluid pressure can be determined by readings from one or more pressure sensors within the cell(s) and/or conduits and/or manifold of the system. Such pressure sensors can provide pressure related signals to a processor to determine required pressure values, and therefrom be used as a factor to control or optimise the fluid pressure.

The or each reference pressure value can be an average of fluid pressure determined within the or each respective said cell and/or within the low and/or high pressure conduit(s) and/or manifold of the system.

Average pressure may be determined, at least in part, by averaging various pressures within a cell or across a number of cells at a particular time (simultaneous average pressure) or across one or more cells over time (temporal averaging).

Preferably the method includes controlling or optimising pressure within the cell(s) to maintain optimum cell pressure as a function of water depth changes with tidal or other longer term effects, and preferably depending on the optimal conditions for the prevailing or current sea state. Thus, as effective water depth increases above the cell(s), pressure within the cell(s) may be increased to balance the increased external pressure from the water, and as water depth decreases, pressure within the cell(s) may be decreased to balance the decreased pressure from the water. In this way, performance and output from the cell(s) and/or system may be optimised for a required output or demand on the system.

Also, in the event of actual or predicted deterioration in sea conditions, pressure within the cell(s) may be reduced to prevent damage to the membrane. Pressure can, if required, be reduced to zero or atmospheric pressure such that the membrane(s) is/are pushed flat by water pressure and do not function until the cell(s) is/are internally pressurised to reinflate the cell(s).

The invention claimed is:

1. A wave energy converter (WEC) for use submerged below a surface of a body of water, the WEC comprising:
   at least one body portion; and
   at least two cells, each of the cells including a flexible membrane, wherein each of said cell bounds at least part of a volume of a fluid within the respective cell, the flexible membranes being fully submerged to a depth in a body of water when in use, and wherein a portion of the at least one membrane is inclined from vertical and inclined from horizontal providing a flow smoothed way for wave energy to travel over the submerged said at least one membrane whilst a pressure differential between a wave pressure external to the respective cell and an internal pressure of the respective cell deforms each of the flexible membranes towards the body to compress the volume of the fluid, wherein the inclination of the substantial portion of the at least one membrane from vertical and horizontal assists coupling conversion of potential and kinetic energy of the wave to pressure within the fluid as the wave energy passes over the submerged WEC, and wherein at least two of the cells supplies pressure into a pressure supply conduit or manifold through a respective at least one supply port of each of those cells.

2. The WEC according to claim 1, further comprising the at least two cells arranged in at least one array forming a multiple cell said wave energy convertor.

3. The WEC according to claim 1, wherein the WEC includes the at least two cells within one said body portion.

4. The WEC according to claim 1, wherein the at least one flexible membrane is inclined between 20° and 70° from horizontal.

5. The WEC according to claim 1, wherein a substantial portion of one or more of the at least two cells incline from horizontal with respect to a said wave passing over the WEC or declines from horizontal with respect to said wave passing over the WEC.

6. The WEC according to claim 1, wherein the submerged wave energy converter comprises the at least two cells tethered, anchored or attached to a seabed or otherwise restrained to restrict the vertical movement of the submerged WEC as the wave passes over the WEC.

7. The WEC according to claim 6, wherein the at least two cells are spaced above the seabed and tethered, anchored or attached thereto or otherwise restrained to restrict the vertical movement of the WEC as the wave passes over the submerged WEC.

8. The WEC according to claim 6, wherein the at least two cells of the WEC are submerged at between 2.5 m and 15 m of water depth on average.

9. The WEC according to claim 1, further comprising a rear of the WEC including an exterior wave flow control having a straight, curved or rounded portion.

10. The WEC according to claim 2, wherein the at least two cells are arranged as one or more linear, curved or circular arrays of said cells.

11. The WEC according to claim 2, wherein at least two cells of the WEC are arranged horizontally with respect to one another.

12. The WEC according to claim 2, deployed as multiple linear or curved arrays of said cells arranged in at least one V or chevron orientated, in use, towards or to face the direction of the oncoming waves or the open sea/ocean and the linear or curved arrays of the V or chevron extend from the apex towards the shore such that the waves approach the apex first and the V or chevron and each array obliquely, or deployed such that an apex of the V or chevron arrangement points towards the shore and away from the waves, such that the linear or curved arrays of the V protect away from the apex towards open water.

13. The WEC according to claim 2, wherein, for the at least one array of said cells, the flexible membranes are spaced so as to couple to different parts of a wavelength of the wave.

14. The WEC according to claim 13, wherein the flexible membrane of at least one said cell is exposed to higher wave pressure, and the flexible membrane of at least another said cell is exposed to lower wave pressure as one or more waves pass over the cell.

15. The WEC according to claim 14, wherein the array is arranged such that when at least one said cell is exposed to the higher wave pressure and pumping fluid out from the cell via at least one outlet port, at least one other of the cells is exposed to the lower wave pressure and accepting return fluid from a reservoir or low pressure manifold via at least one inlet port.

16. The WEC according to claim 1, further comprising one or more cell lower pressure inlet ports, one or more cell higher pressure outlet ports, one or more manifolds for combining or splitting fluid flow respectively to or from said cell(s), and/or one or more turbines driven by the pressure flow from the cell(s).

17. The WEC according to claim 10, wherein, when multiple said cells are arranged in at least one array, with at least one turbine and/or at least one electrical generator mounted toward or at the end of the array or of each said array or anywhere along a length of a said array, or wherein, when multiple said cells are arranged in a V or chevron of multiple arrays of the cells, the turbine or turbines and/or electrical generator or generators is/are mounted adjacent to or in an apex of the V or chevron and airflow streams from each array are combined.

18. The WEC according to claim 16, further comprising a fluid flow control system having at least one check valve or at least one turbine, or a combination of at least one check valve and at least one turbine, provided at or adjacent a port of a respective cell, or provided in one or more conduits, optionally in either or both a low pressure and a high pressure conduit.

19. The WEC according to claim 2, wherein at least one of the at least two cells is on each of opposing sides of the WEC, at least one said cell on a first side. with respect to the wave to extract energy from the wave, and at least. one other said cell to extract energy from the same wave and/or from a returning said wave.

20. The WEC according to claim 2, wherein at least one said array includes a longitudinal array of the cells arranged such that an angle. that the waves impinge on the array is between 10° and 80°.

21. The WEC according to claim 1, wherein the geometric shape of the at least one end of the. at least one membrane of the WEC is geometrically shaped to control elastomeric strain or stress or stress and strain.

22. The WEC according to claim 21, wherein the geometric shape of the at least one end of the flexible membrane is a curve, semicircle, arc or spline.

23. The WEC according to claim 1, wherein, at least one said flexible membrane has chord dimensions allowing the respective membrane to conform to a face of the respective cell when deflated.

24. The WEC according to claim 4, wherein each of the multiple flexible membranes is inclined between 20° and 70° from horizontal.

25. The WEC according to claim 5, wherein each of the cells of the WEC inclines from horizontal with respect to a said wave passing over the WEC or declines from horizontal with respect to said wave passing over the WEC.

26. The WEC according to claim 2, Wherein the cells of the WEC are deployed at between 2.5 m and 15 m of water depth on average.

27. The WEC according to claim 2, further comprising one or more cell lower pressure inlet ports, one or more cell higher pressure outlet ports, one or more manifolds for combining or splitting fluid flow respectively to or from said cells, and/or one or more turbines driven by the pressure flow from the cells.

28. The WEC according to claim 27, further comprising a fluid flow control system having at least one check valve or at least one turbine, or a combination of at least one check valve and at least one turbine, provided at or adjacent a port of a respective cell, or provided in one or more conduits, optionally in either or both a low pressure and a high pressure conduit.

29. The WEC according to claim 1, Wherein the flexible membrane of a respective said cell is multi-layered or laminated.

30. The WEC according to claim 1, Wherein the flexible membrane of a respective said cell incorporates reinforcement.

31. A method of controlling or optimising fluid pressure within a submerged wave energy convertor (WEC) according to claim 1, the WEC having a control system, the method comprising:
increasing or decreasing fluid pressure within the cells of the submerged WEC and/or within at least one low pressure or high pressure conduit and/or within at least one manifold of the system to maintain a desired pressure.

32. The method according to claim 31, further comprising operating the control system, wherein operating the control system comprises increasing or decreasing the fluid pressure within at least one low pressure or high pressure conduit and/or within at least one manifold of the WEC relative to at least one reference pressure value.

33. The method according to claim 32, whereby the fluid pressure or each fluid pressure is an average of fluid pressure determined within each respective said cell.

34. The method according to claim 33, whereby the average pressure is determined, at least in part, by averaging various pressures within a cell or across a number of cells of the WEC at a particular time or across one or more said cells over time.

35. The method according to claims 31, further comprising controlling or optimising fluid pressure within the cells to maintain optimum fluid pressure within the cells as a function of water depth changes with tidal or other effects.

36. The method according to claim 35, Whereby fluid pressure within each respective cell of the cells is increased with an increase in water depth to balance the increased external pressure from the water, and as water depth decreases, fluid pressure within the respective cell of the cells is decreased to balance the decreased pressure from the water.

37. The method according to claim 35, further comprising, in the event of actual or predicted deterioration in sea conditions, reducing the fluid pressure within the cell to prevent damage to the membrane of the respective cell.

38. A WEC according to claim 1, wherein, at least one said flexible membrane has dimensions allowing the respective membrane to conform to a face of the respective cell when deflated or to deflate without pinches or folds in the flexible membrane.

39. The WEC according to claim 1, wherein the WEC includes each cell of the at least two cells within a single body portion separate from the body portion of each the other ones of the at least two cells.

40. The WEC according to claim 39, wherein the body portion of each of the at least two cells is spaced from the body portion of each of the other of the at least two cells.

41. The method of claim 32, whereby the fluid pressure or each fluid pressure is an average of fluid pressure determined within the at least one low pressure conduit and/or within the at least one high pressure conduit and/or manifold of the system.

* * * * *

UNITED STATES PATENT AND TRADEMARK OFFICE
CERTIFICATE OF CORRECTION

PATENT NO. : 9,797,367 B2  
APPLICATION NO. : 14/622717  
DATED : October 24, 2017  
INVENTOR(S) : Glen Lee Ryan et al.

Page 1 of 1

It is certified that error appears in the above-identified patent and that said Letters Patent is hereby corrected as shown below:

On the Title Page

Item (30) in the Foreign Application Priority Data section, please add:  
August 17, 2012 (AU) ..............................AU 2012903556

Signed and Sealed this
Second Day of October, 2018

Andrei Iancu
*Director of the United States Patent and Trademark Office*